(12) United States Patent
Hamaguchi et al.

(10) Patent No.: US 11,099,008 B2
(45) Date of Patent: Aug. 24, 2021

(54) CAPTURE DEVICE ASSEMBLY, THREE-DIMENSIONAL SHAPE MEASUREMENT DEVICE, AND MOTION DETECTION DEVICE

(71) Applicant: SONY CORPORATION, Tokyo (JP)

(72) Inventors: Yuichi Hamaguchi, Tokyo (JP); Shiro Omori, Kanagawa (JP); Hajime Numata, Tokyo (JP); Masahide Hirama, Kanagawa (JP); Yasumasa Oda, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/531,572

(22) PCT Filed: Sep. 4, 2015

(86) PCT No.: PCT/JP2015/075223
§ 371 (c)(1),
(2) Date: May 30, 2017

(87) PCT Pub. No.: WO2016/098400
PCT Pub. Date: Jun. 23, 2016

(65) Prior Publication Data
US 2017/0343338 A1   Nov. 30, 2017

(30) Foreign Application Priority Data
Dec. 15, 2014   (JP) ............................. JP2014-252603

(51) Int. Cl.
*G01B 11/25* (2006.01)
*G06T 7/593* (2017.01)
(Continued)

(52) U.S. Cl.
CPC .......... *G01B 11/2504* (2013.01); *G01B 11/25* (2013.01); *G01B 11/2513* (2013.01);
(Continued)

(58) Field of Classification Search
CPC combination set(s) only.
See application file for complete search history.

(56) References Cited

U.S. PATENT DOCUMENTS 5,753,931 A * 5/1998 Borchers ................ A43D 1/025
250/559.05
6,121,953 A * 9/2000 Walker .................... G06F 3/011
2/421
(Continued)

FOREIGN PATENT DOCUMENTS

EP           2112466 A1    10/2009
JP        09-042940 A      2/1997
(Continued)

OTHER PUBLICATIONS

International Search Report and Written Opinion of PCT Application No. PCT/JP2015/075223, dated Dec. 1, 2015, 03 pages of English Translation and 10 pages of ISRWO.
(Continued)

*Primary Examiner* — Violeta A Prieto
(74) *Attorney, Agent, or Firm* — Chip Law Group

(57) ABSTRACT

An image capture device assembly includes a light source that emits a reference light pattern, an image capture device, and a control device that controls the light source and the image capture device. The light source emits the reference light pattern to a subject with high brightness and low brightness, respectively, under the control of the control device. The image capture device captures an image of the reference light pattern and the subject in a high brightness irradiation state and outputs a first image signal to the control device. The image capture device captures an image of at least the subject in a low brightness irradiation state and outputs a second image signal to the control device. The control device generates a reference light pattern image
(Continued)

signal from a difference between the first image signal and the second image signal.

13 Claims, 14 Drawing Sheets

(51) Int. Cl.
*G06T 7/521* (2017.01)
*G06T 7/254* (2017.01)
*G01P 13/00* (2006.01)

(52) U.S. Cl.
CPC .......... *G01B 11/2545* (2013.01); *G01P 13/00* (2013.01); *G06T 7/254* (2017.01); *G06T 7/521* (2017.01); *G06T 7/593* (2017.01); *G06T 2207/10021* (2013.01)

(56) References Cited

U.S. PATENT DOCUMENTS

| | | | | |
|---|---|---|---|---|
| 7,406,181 | B2* | 7/2008 | O'Boyle | G06K 9/00201 |
| | | | | 382/104 |
| 8,233,079 | B2* | 7/2012 | Aoyama | G01S 7/023 |
| | | | | 348/135 |
| 8,437,535 | B2* | 5/2013 | Boca | G01B 11/25 |
| | | | | 382/154 |
| 10,785,463 | B2* | 9/2020 | Appia | H04N 13/106 |
| 2002/0057438 | A1* | 5/2002 | Decker | G01B 11/2509 |
| | | | | 356/601 |
| 2003/0112447 | A1 | 6/2003 | Harding et al. | |
| 2003/0212506 | A1* | 11/2003 | Sundman | A43D 1/025 |
| | | | | 702/40 |
| 2004/0201586 | A1* | 10/2004 | Marschner | G06K 9/00268 |
| | | | | 345/426 |
| 2004/0240754 | A1* | 12/2004 | Smith | G01B 11/25 |
| | | | | 382/286 |
| 2005/0111700 | A1* | 5/2005 | O'Boyle | G06K 9/00201 |
| | | | | 382/104 |
| 2008/0069435 | A1* | 3/2008 | Boca | G01B 11/25 |
| | | | | 382/153 |
| 2008/0225303 | A1* | 9/2008 | Lampalzer | G01B 11/2513 |
| | | | | 356/612 |
| 2010/0110280 | A1 | 5/2010 | Aoyama | |
| 2013/0010106 | A1* | 1/2013 | Yokota | H04N 13/239 |
| | | | | 348/135 |
| 2014/0015963 | A1* | 1/2014 | Klaas | G01N 21/8806 |
| | | | | 348/136 |
| 2014/0307058 | A1* | 10/2014 | Kirk | G06F 12/02 |
| | | | | 348/47 |
| 2020/0374502 | A1* | 11/2020 | Appia | H04N 13/25 |

FOREIGN PATENT DOCUMENTS

| | | |
|---|---|---|
| JP | 9-42940 A | 2/1997 |
| JP | 2002-213931 A | 7/2002 |
| JP | 2007-183181 A | 7/2007 |
| JP | 2008-197048 A | 8/2008 |
| JP | 2011-085539 A | 4/2011 |
| JP | 2012-080065 A | 4/2012 |
| JP | 2012-242281 A | 12/2012 |
| WO | 2008/099629 A1 | 8/2008 |

OTHER PUBLICATIONS

Office Action for JP Patent Application No. 2020-005815 dated Jan. 5, 2021, 04 pages of Office Action and 04 pages of English Translation.

Office Action for JP Patent Application No. 2020-005815, dated Apr. 6, 2021, 02 pages of English Translation and 02 pages of Office Action.

* cited by examiner

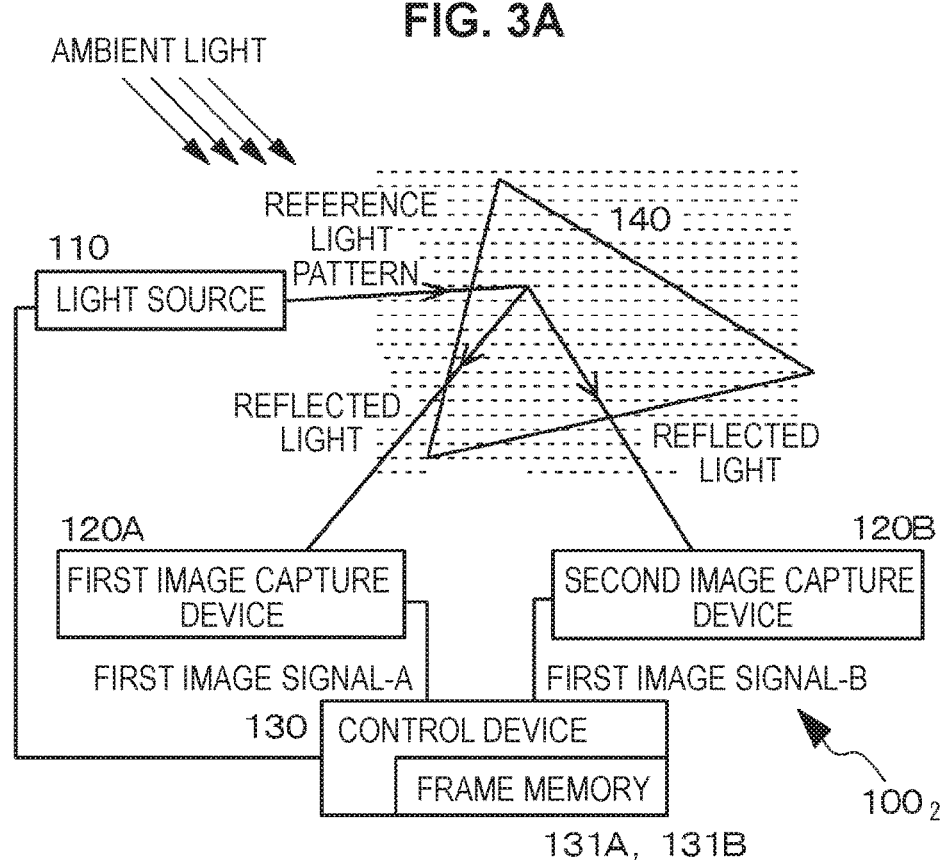
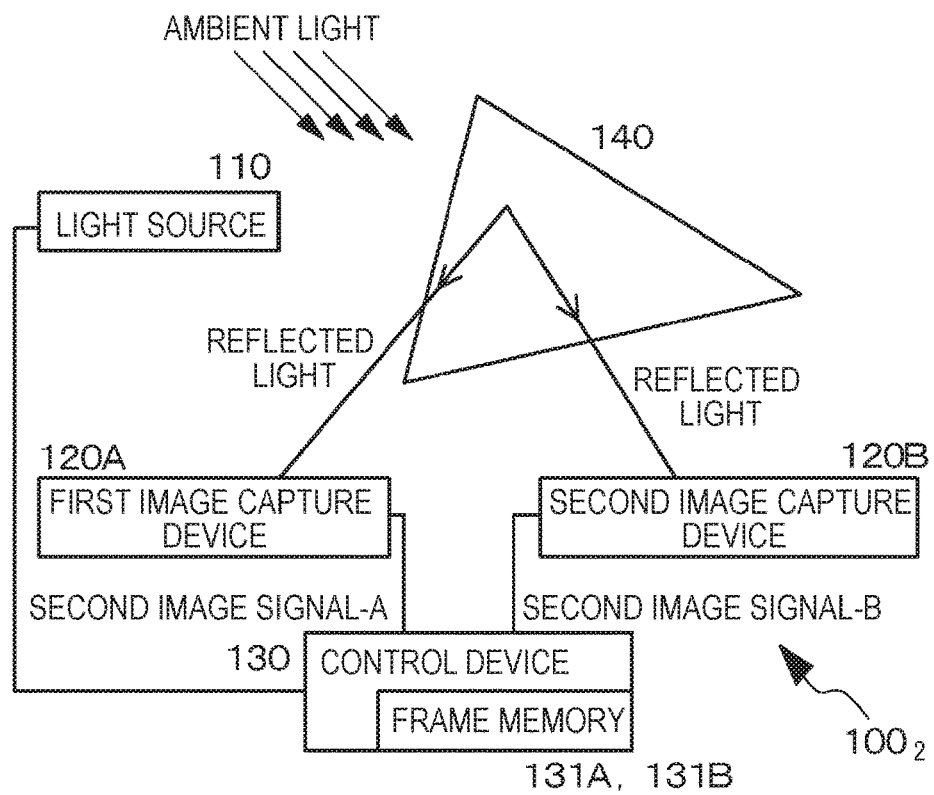

CAPTURE DEVICE ASSEMBLY, THREE-DIMENSIONAL SHAPE MEASUREMENT DEVICE, AND MOTION DETECTION DEVICE

CROSS REFERENCE TO RELATED APPLICATIONS

This application is a U.S. National Phase of International Patent Application No. PCT/JP2015/075223 filed on Sep. 4, 2015, which claims priority benefit of Japanese Patent Application No. JP 2014-252603 filed in the Japan Patent Office on Dec. 15, 2014. Each of the above-referenced applications is hereby incorporated herein by reference in its entirety.

TECHNICAL FIELD

The present disclosure relates to an image capture device assembly, a three-dimensional shape measurement device, and a motion detection device.

BACKGROUND ART

As a method for measuring a distance to a subject or measuring a three-dimensional shape of the subject in a non-contact manner, a stereo method for performing measurement using two image capture devices provided in parallel and the principle of triangulation, and an active stereo method for performing measurement using one light source and one image capture device provided in parallel are known (for the latter one, see Patent Literature 1). Specifically, in the active stereo method, for example, a reference light pattern based on infrared light is emitted from a light source that includes a laser device, and a subject is irradiated with the reference light pattern. As the reference light pattern, for example, a line and space pattern, a grid pattern, or a dot pattern may be used. Further, an image of the subject irradiated with the reference light pattern is captured by an image capture device. Here, as shown in a conceptual diagram of FIG. 14A, when a distance between a light source and an image capture device (the length of a base line) is L, an angle formed by emission light (light beams) that is irradiated to a subject and the base line is α, an angle formed by a straight line that connects a portion of the subject with which the emission light collides and the image capture device and the base line is β, the light source is disposed at the origin (0, 0) of a coordinate system, and coordinates of the portion of the subject with which the light beams collide are (x, y), (x, y) is represented as the following expression (A). Further, the stereo method is a method for using two image capture devices, in which the light source in the active stereo method is replaced with one image capture device, but as shown in a conceptual diagram of FIG. 14B, a method having a configuration in which the light source is separately provided may be conceived.

$$x = L \cdot \tan(\beta) / \{(\tan(\alpha) + \tan(\beta))$$

$$y = L \cdot \tan(\beta) \cdot \tan(\alpha) / \{\tan(\alpha) + \tan(\beta)\} \quad (A)$$

CITATION LIST

Patent Literature

Patent Literature 1: JP 2007-183181A

DISCLOSURE OF INVENTION

Technical Problem

However, in the active stereo method or the stereo method using the reference light pattern, it is necessary to obtain the reference light pattern irradiated to the subject as image data by the image capture device. However, a problem that it is difficult to obtain the image data of the reference light pattern irradiated to the subject due to the influence of ambient light (sunlight, indoor lighting, or the like) frequently occurs. Even if the sensitivity of the image capture device is increased, since the sensitivity of the image capture device with respect to the ambient light is also increased, this cannot be a radical solution. A method for removing light having the same wavelength as the wavelength of light emitted from a light source from ambient light using a filter may also be considered, but there is a limit in a band of the filter, and it is difficult to remove such light from the ambient light with high efficiency. In a method for increasing the brightness of a light source, there is a problem in that power consumption of the light source is increased, and in that a reference light pattern is visually recognized according to circumstances.

Accordingly, an object of the present disclosure is to provide an image capture device assembly capable of reliably obtaining a reference light pattern irradiated to a subject as image data by an image capture device without being influenced by ambient light in an active stereo method or a stereo method using the reference light pattern, a three-dimensional shape measurement device and a motion detection device using the image capture device assembly.

Solution to Problem

In order to achieve the above-mentioned described object, an image capture device assembly according to a first aspect of the present disclosure includes:

a light source that emits a reference light pattern;
an image capture device; and
a control device that controls the light source and the image capture device.

The light source emits the reference light pattern to a subject with high brightness and low brightness, respectively, under the control of the control device, the image capture device captures an image of the reference light pattern and the subject in a high brightness irradiation state and outputs a first image signal to the control device, or captures an image of at least the subject in a low brightness irradiation state and outputs a second image signal to the control device, and the control device generates a reference light pattern image signal from a difference between the first image signal and the second image signal.

In order to achieve the above-mentioned object, an image capture device assembly according to a second aspect of the present disclosure includes:

a light source that emits a polarized reference light pattern;
an image capture device; and
a control device that controls the light source and the image capture device.

The image capture device includes a first polarizer having a polarization axis in a direction parallel to a polarization direction of the reference light pattern, and a second polarizer having a polarization axis in a direction perpendicular to the polarization direction of the reference light pattern, the image capture device outputs a first image signal obtained on a basis of polarized light passed through the first polarizer to the control device, and outputs a second image signal obtained on a basis of polarized light passed through the second polarizer to the control device, and the control device generates a reference light pattern image signal from a difference between the first image signal and the second image signal.

In order to achieve the above-mentioned object, a three-dimensional shape measurement device of the present disclosure includes an image capture device assembly according to the first and second aspects of the present disclosure.

In order to achieve the above-mentioned object, a motion detection device of the present disclosure includes the image capture device assembly according to the first and second aspects of the present disclosure.

Advantageous Effects of Invention

According to the image capture device assembly according to the first aspect or the second aspect of the present disclosure, the three-dimensional shape measurement device and the motion detection device of the present disclosure including the image capture device assembly according to the first aspect or the second aspect of the present disclosure, since a reference light pattern image signal is generated from a difference between a first image signal and a second image signal, it is possible to remove the influence of ambient light from the reference light pattern image signal. Effects disclosed in the present specification are not limitative but illustrative, and additional effects may be achieved.

BRIEF DESCRIPTION OF DRAWINGS

FIGS. 3A and 3B are diagrams schematically showing a state in which a first image signal is acquired and a state in which a second image signal is acquired, respectively, in the image capture device assembly according to Example 2.

MODES FOR CARRYING OUT THE INVENTION

Figure 1A:
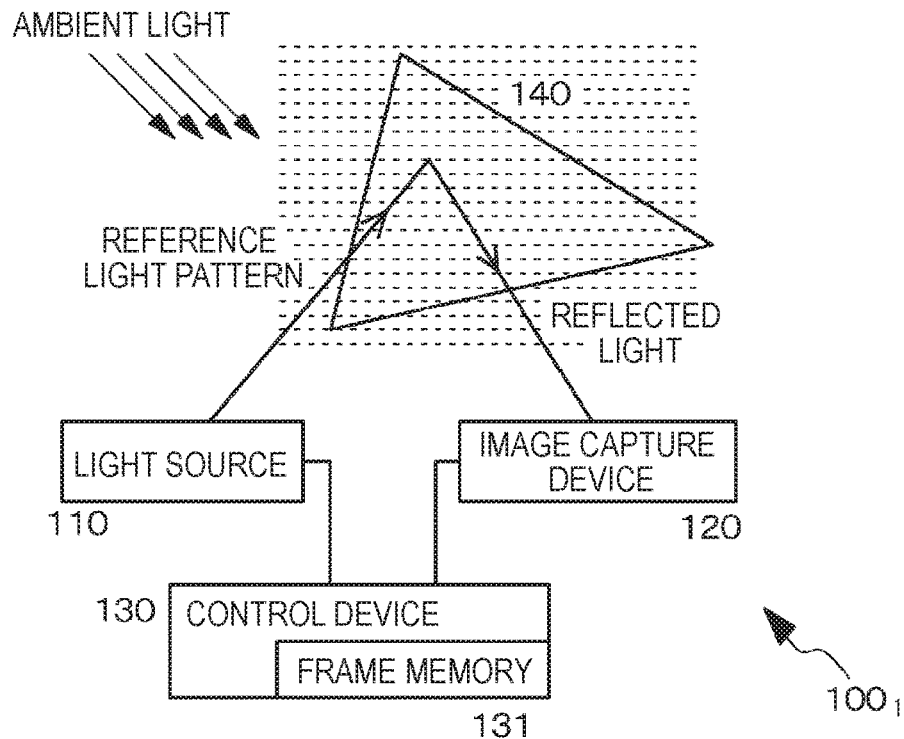
FIG. 1A is a conceptual diagram showing an image capture device assembly (an image capture device assembly according to a first aspect of the present disclosure) according to Example 1.

Hereinafter, the present disclosure will be described on the basis of examples with reference to the appended drawings. The present disclosure is not limited to the examples, and the various numeric values and materials shown in the examples are illustrative. Note that description will be provided in the following order.

1. Overall description of image capture device assemblies according to first and second aspects of the present disclosure, three-dimensional shape measurement device of the present disclosure, and motion detection device of the present disclosure
2. Example 1 (image capture device assembly according to first aspect of the present disclosure)
3. Example 2 (modification of Example 1)
4. Example 3 (modifications of Example 1 and Example 2)
5. Example 4 (image capture device assembly according to second aspect of the present disclosure)
6. Example 5 (modification of Example 4)
7. Example 6 (another modification of Example 4)
8. Others <Overall Description of Image Capture Device Assemblies According to First and Second Aspects of the Present Disclosure, Three-Dimensional Shape Measurement Device of the Present Disclosure, and Motion Detection Device of the Present Disclosure>

Image capture device assembles according to a first aspect and a second aspect of the present disclosure, or the image capture device assemblies according to the first aspect and the second aspect of the present disclosure provided in a three-dimensional shape measurement device of the present disclosure and a motion detection device of the present disclosure may be collectively referred to as an "image capture device assembly and the like of the present disclosure". The image capture device assembly according to the first aspect of the present disclosure, or the image capture device assembly according to the first aspect of the present disclosure provided in the three-dimensional shape measurement device of the present disclosure and the motion detection device of the present disclosure may be collectively referred to as an "image capture device assembly and the like according to the first aspect of the present disclosure". Further, the image capture device assembly according to the second aspect of the present disclosure, or the image capture device assembly according to the second aspect of the present disclosure provided in the three-dimensional shape measurement device of the present disclosure and the motion detection device of the present disclosure may be collectively referred to as an "image capture device assembly and the like according to the second aspect of the present disclosure".

In the image capture device assembly and the like of the present disclosure, a control device includes a frame memory, and may be configured to store one of a first image signal and a second image signal in the frame memory. The frame memory may employ a frame memory having a configuration and a structure which are known. Here, in order to generate a reference light pattern image signal from a difference between the first image signal and the second image signal, hardware which serves as the frame memory may be used, but the present disclosure is not limited thereto. Instead, the difference between the first image signal and the second image signal may be calculated by software-based computing.

In the image capture device assembly and the like according to the first aspect of the present disclosure including the above-mentioned preferable form, when an image capture time in image capturing a reference light pattern and a subject in a high brightness irradiation state is represented as $T_1$, and an image capture time in image capturing at least the subject in a low brightness irradiation state is represented as $T_2$, $T_1 > T_2$ may be satisfied. On the basis of an instruction from a user of the image capture device assembly, the image capture times $T_1$ and $T_2$ may be made variable, or the ratio of $T_1$ and $T_2$ may be made variable.

Alternatively, in the image capture device assembly and the like according to the first aspect of the present disclosure including the above-mentioned preferable configuration, one image capture frame may be divided into a plurality of periods, one period in the plurality of periods may be set to be in the low brightness irradiation state, and the remaining periods may be set to be in the high brightness irradiation state. Further, in this case, although it is not limitative, the image capture frame rate may be 30 frames per second, and one image capture frame may be divided into two or more periods (for example, two to four).

In this present specification, "one image capture frame" means one image capture frame for generating a reference light pattern image signal from a difference between a first image signal and a second image signal, and does not mean the number of images per second for obtaining a video image. This is similarly applied to an image capture device assembly and the like according to the second aspect of the present disclosure.

Alternatively, in the image capture device assembly and the like according to the first aspect of the present disclosure including the above-described preferred form, an image capture period during which the image of the reference light pattern and the subject is captured in the high brightness irradiation state and an image capture period during which the image of at least the subject is captured in the low brightness irradiation state may be repeated, and the former image capture period may be longer than the latter image capture period.

Further, in the image capture device assembly and the like according to the first aspect of the present disclosure including the above-described various preferred forms and configurations, the image capture device may include image capture elements which are arranged in a first direction and a second direction in a two-dimensional matrix form, the image capture device may include a rolling shutter mechanism, and the control device may control the light source and the image capture device so that all the image capture elements capture the image of the reference light pattern and the subject in the high brightness irradiation state and output the first image signal thereto, and so that all the image capture elements capture the image of at least the subject in the low brightness irradiation state and output the second image signal thereto.

In the image capture device assembly and the like according to the first aspect of the present disclosure including the preferred forms and configurations, the light source may be in an operation state (that is, in a state in which the light source emits a reference light pattern) in the high brightness irradiation state and may be in a non-operation state (that is, in a state in which the light source does not emit the reference light pattern) in the low brightness irradiation state. The brightness of the reference light pattern emitted from the light source (the light intensity of the light emitted by the light source) may be appropriately determined through various tests. Alternatively, a user may switch or change the brightness of the reference light pattern emitted from the light source (the light intensity of light emitted by the light source) by performing switching between an indoor mode and an outdoor mode, for example. Even if the light source is set to be in the operation state (that is, in a state in which the light source emits the reference light pattern) in the low brightness irradiation state, if the high brightness irradiation state or the low brightness irradiation state is appropriately selected, it is possible to remove the influence of ambient light from a reference light pattern image signal by calculating the difference between the first image signal and the second image signal.

In the image capture device assembly and the like according to the first aspect of the present disclosure including the above-described various preferred forms and configurations, one image capture device may be provided, and the image capture device may be configured by a stereo image capture device. Further, in an image capture device assembly and the like according to the second aspect of the present disclosure including the above-described various preferred forms and configurations, one image capture device may be provided, and the image capture device may include a first polarizer and a second polarizer. Alternatively, two image capture device may be provided, in which one image capture device may include the first polarizer, and the other image capture device may include the second polarizer. Further, the polarizers may not be provided.

A three-dimensional shape estimation device of the present disclosure including the above-described various preferred forms and configurations further includes a computing unit, in which the computing unit may calculate a three-dimensional shape of a subject from a reference light pattern image signal.

Also, a motion detection device of the present disclosure including the above-described various preferred forms and configurations may further include a computing unit. The computing unit may calculate a three-dimensional shape of a subject from a reference light pattern image signal, may extract a characteristic point of the subject from the calculated three-dimensional shape, may calculate the position of the characteristic point of the subject, and may detect a motion of the subject from change in the position of the calculated characteristic point.

In the image capture device assembly and the like of the present disclosure including the above-described various preferred forms and configurations, it is preferable that the light source be a light source that emits infrared light having a wavelength of 780 nm to 980 nm, for example, but this is not limited thereto. The light source may be configured by a semiconductor laser device, and a semiconductor light emitting device such as a light emitting diode (LED), or a super luminescent diode (SLD). The light source may be continuously driven during irradiation depending on a form of the light emitting device that forms the light source, or may be pulse-driven. A duty ratio in the case of pulse-driving may be appropriately determined.

As reference light pattern, for example, a line and space shape pattern, a grid pattern, or a dot pattern may be used, but this is not limited thereto, and an arbitrary pattern may be substantially used. In order to obtain the line and space shape pattern, the grid pattern, and the dot pattern, for example, a diffraction grating or the like may be disposed on a light emission side of the light source, and the pattern may be generated by an MEMS mirror. Alternatively, a density gradient pattern, a checkered grid pattern, a conical pattern, or the like may be used. In order to obtain a polarized reference light pattern, a polarizer may be disposed on the light emission side of the light source. In a case in which light itself emitted from the light source is polarized, a polarizer may not be disposed on the light emission side of the light source. Generally, light whose vibration direction is only a specific direction is referred to as "polarized light", and the vibration direction is referred to as a "polarization direction" or a "polarization axis".

In the image capture device assembly and the like of the present disclosure, the image capture device may employ a known image capture device including a charge coupled device (CCD) type image capture element, a complementary metal oxide semiconductor (CMOS) type image capture element, a charge modulation device (CMD) type signal amplification image capture element, or an image capture element (an image sensor) called a contact image sensor (CIS) image, for example. The image capture device may include an image capture element suitable for capturing an image of a subject and an image capture element suitable for capturing an image of a reference light pattern, and for example, may be configured by a combination of an image capture element that detects red light, an image capture element that detects green light, an image capture element that detects blue light, and an image capture element that detects infrared light. The image capture device itself may have a configuration and a structure which are known. Further, the image capture device may employ a surface irradiation type solid-state image capture device or a back-side irradiation type solid-state image capture device, and for example, may be configured by a digital still camera, a video camera, or a camcorder. The image capture device may include an image capture element capable of converting light having the above-mentioned wavelength into a signal (specifically, for example, an image capture element that receives infrared light). The image capture device may further include an image capture element that receives red light, an image capture element that receives green light, an image capture element that receives blue light, and the like, in addition to the image capture element that receives infrared light. In measurement of a three-dimensional shape of a subject irradiated with a reference light pattern, or in detection of a motion thereof, at the minimum, image capturing may be performed at a wavelength of the reference light pattern (for example, infrared light). Here, by further including the image capture element that receives red light, the image capture element that receives green light, the image capture element that receives blue light, and the like, in addition to the image capture element that receive infrared light, it is possible to enhance the accuracy of measurement or detection, and to perform the capturing of the image of the subject simultaneously with the measurement of the three-dimensional shape or the detection of the motion.

In the image capture device assembly and the like according to the first aspect of the present disclosure, in a form where one image capture device is provided, a distance from an image capture device to a subject, a two-dimensional shape or a three-dimensional shape of the subject, a motion of the subject, and the like may be calculated on the basis of an active stereo method. Further, in a form in which two image capture devices are provided, a distance from an image capture device to a subject, a two-dimensional shape or a three-dimensional shape of the subject, a motion of the subject, and the like may be calculated on the basis of a stereo method. In the image capture device assembly and the like according to the second aspect of the present disclosure, in a form in which one image capture device is provided, a distance from an image capture device to a subject, a two-dimensional shape or a three-dimensional shape of the subject, a motion of the subject, and the like may be calculated on the basis of an active stereo method. Further, in a form in which two image capture devices are provided and each of two image capture devices includes a first polarizer and a second polarizer, a distance from one image capture device to a subject, a two-dimensional shape or a three-dimensional shape of the subject, a motion of the subject, and the like may be calculated on the basis of an active stereo method or a stereo method. Furthermore, in a form in which two image capture devices are provided and one image capture device includes a first polarizer and the other image capture device includes a second polarizer, a distance from one image capture device to a subject, a two-dimensional shape or a three-dimensional shape of the subject, a motion of the subject, and the like may be calculated on the basis of a stereo method. In the image capture device assembly according to the first aspect or the second aspect of the present disclosure, a so-called shutter mechanism may be any one of a global shutter mechanism and a rolling shutter mechanism.

In a preferable form of the image capture device assembly and the like of the present disclosure, as described above, it is preferable that the image capture times $T_1$ and $T_2$ satisfy $T_1 > T_2$, and thus, it is possible to achieve reduction of the brightness (the light intensity of the light emitted by the light source) of the reference light pattern emitted from the light source. Here, the present disclosure is not limited thereto, and for example, the image capture times $T_1$ and $T_2$ satisfy may be set to satisfy $T_1/T_2=1$. The image capture times $T_1$ and $T_2$ may be determined on the basis of a specification of an image capture device.

The image capture device may include a filter that transmits light having the same wavelength as the wavelength of light emitted from the light source. In a case in which a subject is irradiated with a reference light pattern having a predetermined wavelength (for example, a wavelength of about 850 nm), and in a case in which a three-dimensional shape of the irradiated subject is measured or a motion thereof is detected, at the minimum, it is sufficient for an image capture device to be able to capture an image of only a predetermined wavelength component (a wavelength component of the reference light pattern). Accordingly, a wavelength selection filter having a desired characteristic, for example, a band pass filter that transmits only light having a wavelength of about 850 nm may be provided on an incident light side of the image capture device. Thus, it is possible to reduce the influence of a wavelength component other than 850 nm in ambient light as much as possible, and to realize a three-dimensional measurement device or a motion detection device less influenced by the ambient light. The characteristic of the wavelength selection filter is not limited to the band pass filter, and may be appropriately determined according to a wavelength profile of ambient light or a frequency characteristic of an image capture device.

The subject is basically arbitrary. The image capture device assembly and the like of the present disclosure may be used outdoor or indoor. The image capture device assembly and the like of the present disclosure may be applied to a motion sensor, a monitoring camera system, a depth sensor, a three-dimensional shape sensor, a two-dimensional shape sensor, a three-dimensional position sensor, a two-dimensional position sensor, a distance sensor, a range sensor, a vehicle collision prevention sensor, a quality management, or a quality inspection system, for example.

From a viewpoint of an image capture method, an image capture method according to a first aspect is substantially an image capture method using the image capture device assembly according to the first aspect of the present disclosure, and includes irradiating a subject with a reference light pattern with high brightness and low brightness, respectively; capturing an image of the reference light pattern and the subject in a high brightness irradiation state to obtain a first image signal, and capturing an image of at least the subject in a low brightness irradiation state to obtain a second image signal; and generating a reference light pattern image signal from a difference between the first image signal and the second image signal.

Further, an image capture method according to a second aspect is substantially an image capture method using the image capture device assembly according to the second aspect of the present disclosure, and includes irradiating a subject with a polarized reference light pattern; obtaining a first image signal on the basis of polarized light which is polarized in a direction parallel to a polarization direction of the reference light pattern, and obtaining a second image signal on the basis of polarized light which is polarized in a direction perpendicular to the polarization direction of the reference light pattern or light that does not depend on the polarization direction; and generating a reference light pattern image signal from a difference between the first image signal and the second image signal.

From a viewpoint of a three-dimensional shape measurement method, a three-dimensional shape measurement method according to a first aspect is substantially a three-dimensional shape measurement method using the image capture device assembly according to the first aspect of the present disclosure, and includes irradiating a subject with a reference light pattern with high brightness and low brightness, respectively; capturing an image of the reference light pattern and the subject in a high brightness irradiation state to obtain a first image signal, and capturing an image of at least the subject in a low brightness irradiation state to obtain a second image signal; generating a reference light pattern image signal from a difference between the first image signal and the second image signal; and calculating a three-dimensional shape from the reference light pattern image signal.

Further, a three-dimensional shape measurement method according to a second aspect is substantially a three-dimensional shape measurement method using the image capture device assembly according to the second aspect of the present disclosure, and includes irradiating a subject with a polarized reference light pattern; obtaining a first image signal on the basis of polarized light which is polarized in a direction parallel to a polarization direction of the reference light pattern, and obtaining a second image signal on the basis of polarized light which is polarized in a direction perpendicular to the polarization direction of the reference light pattern or light that does not depend on the polarization direction; generating a reference light pattern image signal from a difference between the first image signal and the second image signal; and calculating a three-dimensional shape from the reference light pattern image signal.

From a viewpoint of a motion detection method, a motion detection method according to a first aspect is substantially a motion detection method using the image capture device assembly according to the first aspect of the present disclosure, and includes irradiating a subject with a reference light pattern with high brightness or low brightness, respectively; sequentially capturing an image of the reference light pattern and the subject in a high brightness irradiation state to sequentially obtain a first image signal, and sequentially capturing an image of at least the subject in a low brightness irradiation state to sequentially obtain a second image signal; sequentially generating a reference light pattern image signal from a difference between the first image signal and the second image signal; and sequentially calculating a three-dimensional shape of the subject on the basis of the reference light pattern image signal, sequentially extracting a characteristic point of the subject from the calculated three-dimensional shape, sequentially calculating a position of the characteristic point of the subject, and detecting a motion of the subject from change in the position of the calculated characteristic point.

Further, a motion detection method according to a second aspect is substantially a motion detection method using the image capture device assembly according to the second aspect of the present disclosure, and includes irradiating a subject with a polarized reference light pattern; sequentially obtaining a first image signal on the basis of polarized light which is polarized in a direction parallel to a polarization direction of the reference light pattern, and sequentially obtaining a second image signal on the basis of polarized light which is polarized in a direction perpendicular to the polarization direction of the reference light pattern or light that does not depend on the polarization direction; sequentially generating a reference light pattern image signal from a difference between the first image signal and the second image signal; and sequentially calculating a three-dimensional shape of the subject on the basis of the reference light pattern image signal, sequentially extracting a characteristic point of the subject from the calculated three-dimensional shape, sequentially calculating a position of the characteristic point of the subject, and detecting a motion of the subject from change in the position of the calculated characteristic point.

Example 1

Example 1 relates to the image capture device assembly according to the first aspect of the present disclosure, the three-dimensional shape measurement device of the present disclosure, and the motion detection device of the present disclosure.

Figure 2A:
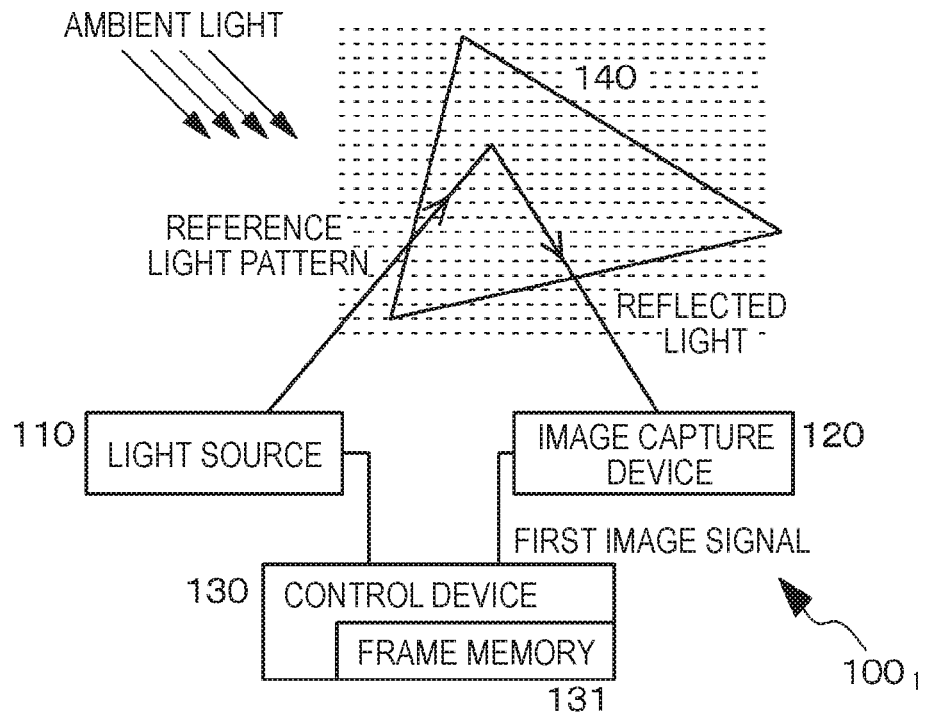
FIGS. 2A and 2B are diagrams schematically showing a state in which a first image signal is acquired and a state in which a second image signal is acquired, respectively, in the image capture device assembly according to Example 1.
Figure 2B:
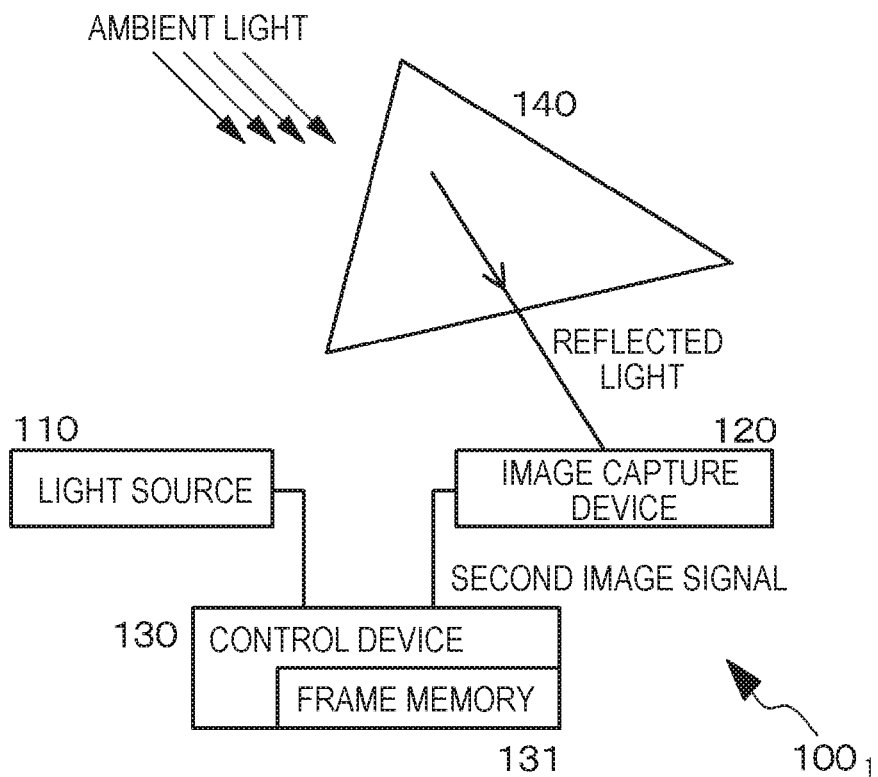

As shown in a conceptual diagram of FIG. 1A, an image capture device assembly $100_1$ of Example 1 includes a light source 110 that emits a reference light pattern (indicated by a plurality of dotted lines that extend in a lateral direction in the figure), an image capture device 120, and a control device 130 that controls the light source 110 and the image capture device 120. Further, under the control of the control device 130, the light source 110 emits the reference light pattern toward a subject 140 with high brightness and with low brightness, respectively (see FIGS. 2A and 2B). The image capture device 120 captures an image of the reference light pattern and the subject 140 in a high brightness irradiation state and outputs a first image signal to the control device 130. The image capture device 120 captures an image of at least the subject 140 in a low brightness irradiation state and outputs a second image signal to the control device 130. The control device 130 generates a reference light pattern image signal from a difference between the first image signal and the second image signal.

The three-dimensional shape measurement device and the motion detection device of Example 1 include the image capture device assembly of Example 1. Here, the three-dimensional shape measurement device of the present disclosure further includes a computing unit, and the computing unit calculates a three-dimensional shape of the subject from the reference light pattern image signal. Further, the motion detection device of Example 1 further includes a computing unit, and the computing unit calculates a three-dimensional shape of the subject from the reference light pattern signal, extracts a characteristic point of the subject from the calculated three-dimensional shape, calculates the position of the characteristic point of the subject, and detects a motion of the subject from change in the position of the calculated characteristic point.

In Example 1, or in Example 2 to Example 6 (which will be described later), the control device 130 or a control device 230 includes a frame memory 131 or 231, and stores any one of the first image signal and the second image signal in the frame memory 131 or 231. The light source 110 or a light source 210 is a light source that emits infrared light with a wavelength of 850 nm, for example, and is configured by a semiconductor laser device. As the reference light pattern, a line and space shape pattern is used, but the reference light pattern is not limited thereto. In order to obtain the line and space shape pattern, a diffraction grating (not shown) is disposed on a light output side of the light source 110 or 210, as necessary. The image capture device 120 or 220 is configured by a known video camera or camcorder configured so that CMOS type image capture elements (CMOS image sensors) are arranged in a two-dimensional matrix form in which M elements are arranged in a first direction (row direction) and N elements are arranged in a second direction (column direction). Further, the image capture device 120 or 220 is configured by a combination of an image capture element that detects red light, an image capture element that detects green light, an image capture element that detects blue light, and an image capture element that detects infrared light. Here, the present disclosure is not limited thereto, and the image capture device 120 or 220 may be configured by only an image capture element that detects infrared light.

The image capture device assembly $100_1$ of Example 1 includes one image capture device 120. A shutter mechanism in the image capture device 120 may be any one of a global shutter mechanism and a rolling shutter mechanism.

Hereinafter, an overview of an image capture method using the image capture device assembly of Example 1 will be described. In the image capture method, for example, a distance from an image capture device to a subject, a two-dimensional shape or a three-dimensional shape of the subject, a motion of the subject, and the like are calculated on the basis of an active stereo method. Further, in the three-dimensional shape measurement device of the present disclosure of Example 1, a three-dimensional shape of a subject is measured on the basis of a known processing algorithm from image data based on a reference light pattern image signal obtained by the image capture method using the image capture device assembly of Example 1. In the motion detection device of Example 1, a motion of a subject is detected on the basis of a known processing algorithm from image data based on a reference light pattern image signal obtained by the image capture method using the image capture device assembly of Example 1.

Figure 11A:
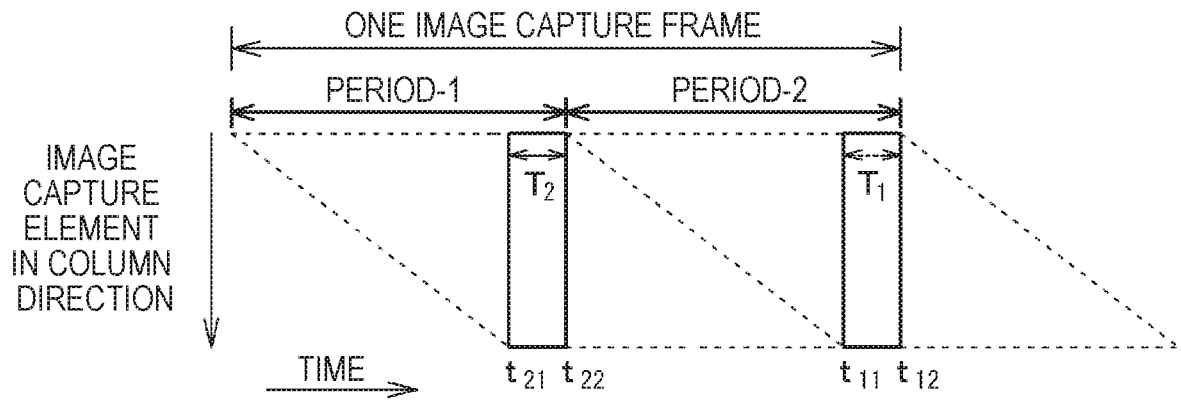
FIGS. 11A, 11B, and 11C are diagrams schematically showing image capture times T1 and T2 per image capture frame.
Figure 11B:
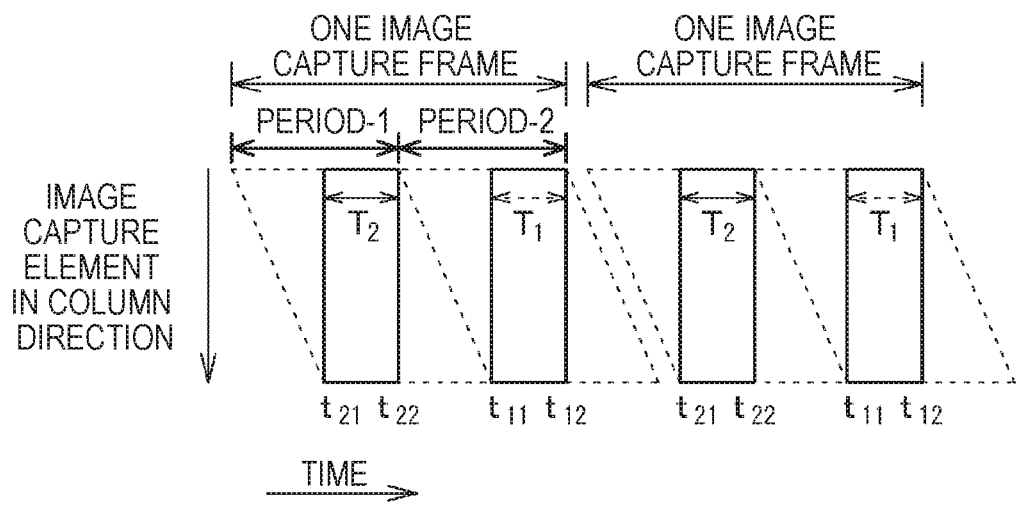
Figure 11C:
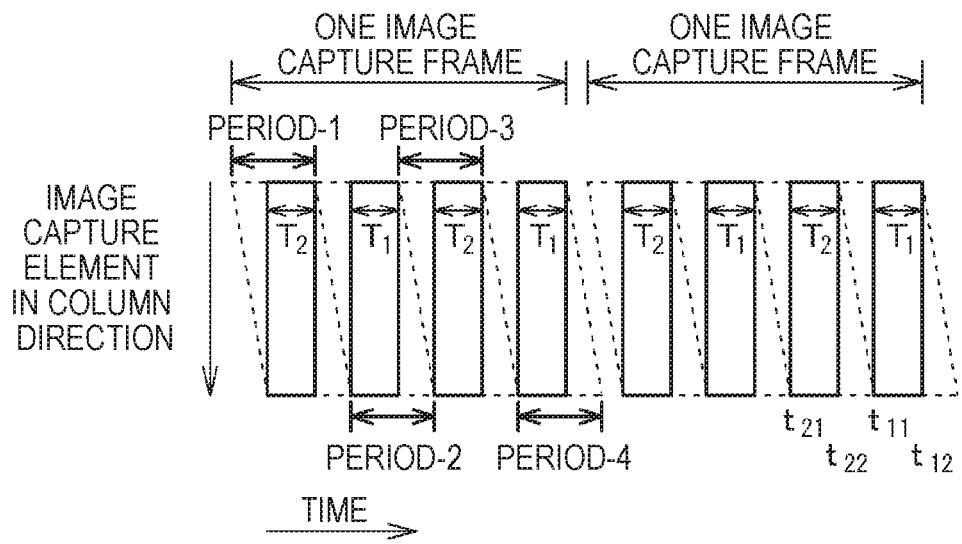

Under the control of the control device 130, the light source 110 emits a reference light pattern toward the subject 140 with high brightness and with low brightness, respectively. That is, the light source 110 irradiates the subject 140 with the reference light pattern at high brightness and low brightness, respectively. In Example 1, the image capture time $T_1$ in capturing the image of the reference light pattern and the subject in the low brightness irradiation state and the image capture time $T_2$ in capturing the image of at least the subject in the high brightness irradiation state are set to satisfy $T_1=T_2$, such that the image capture times $T_1$ and $T_2$ per image capture frame are schematically shown in FIGS. 11A, 11B, and 11C. These figures show a case in which a rolling shutter mechanism is employed as the shutter mechanism. In FIGS. 11A to 11C, and in FIGS. 12A, 12B, 13A and 13B (which will be described later), each of the high brightness irradiation state and the low brightness irradiation state is indicated by a solid rectangle.

Here, the image capture device 120 includes image capture elements which are arranged in a two-dimensional matrix form in a first direction and a second direction. The image capture device 120 includes a rolling shutter mechanism, and the control device 130 controls the light source 110 and the image capture device 120 so that all the image capture elements capture an image of a reference light pattern and a subject in the high brightness irradiation state and output a first image signal to the control device 130, and so that all the image capture elements capture an image of at least the subject in the low brightness irradiation state and outputs a second image signal to the control device 130.

In the example shown in FIG. 11A, the number of frames of images-captured per second is set to 15 (image capture frame rate: 15 fps) and one image capture frame period is divided into two periods ("period-1" and "period-2"). Further, in the examples shown in FIGS. 11B and 11C, the number of frames of images captured per second is set to 30 (image capture frame rate: 30 fps). In FIG. 11B, one image capture frame period is divided into two periods ("period-1" and "period-2"), and in FIG. 11C, one image frame period is divided into four periods ("period-1", "period-2", "period-3", and "period-4"). Time lengths of the divided periods are the same. As the number of frames of images captured per second increases, and as the number of divided periods in one image capture frame period increases, the shape of a parallelogram that schematically shows one image capture frame is changed. Specifically, an inclined angle of an oblique side extending from an upper left portion to a lower right portion becomes larger as the number of frames of images captured per second becomes larger and as the number of divided periods in one image capture frame period becomes larger. That is, as the number of image capture frames per second becomes larger, and as the number of divided periods in one image capture frame period becomes larger, a photosensitive time in a case in which the rolling shutter mechanism is employed becomes longer. As a result, a time length capable of being set as the high brightness irradiation state can be lengthened.

If a time when all the image capture elements can be irradiated with a reference light pattern of the same light intensity in one image capture frame is not present, it is difficult to accurately remove the influence of ambient light. In the example shown in FIG. 11A, the time lengths of the image capture times $T_1$ and $T_2$ correspond to about 10% of time lengths of "period-1" and "period-2". Accordingly, it is preferable that the number of frames of images captured per second be equal to or larger than 15 (image capture frame rate: 15 fps) and the number of divided periods in one image capture frame be equal to or larger than 2. Further, as described above, since as the number of frames of images captured per second (image capture frame rate) becomes larger, and as the number of divided periods in one image capture frame period becomes larger, it is possible to lengthen the time when all the image capture elements can be irradiated with the reference light pattern of the same light intensity in one image capture frame, it is more preferable that the number of frames of images captured per second be equal to or larger than 30 (image capture frame rate: 30 fps or more) and the number of divided periods in one image capture frame be equal to or larger than 2, and it is even more preferable that the number of frames of images captured per second be equal to or larger than 30 (image capture frame rate: 30 fps or more) and the number of divided periods in one image capture frame be equal to or larger than 3. In the examples shown in FIGS. 11B and 11C, the time lengths of the image capture times $T_1$ and $T_2$ are about 50% and 70% of the time lengths of "period-1" and "period-2".

The light source 110 is set to be in an operation state (that is, in a state in which the light source emits a reference light pattern) in the high brightness irradiation state, and the light source 110 is set to be in a non-operation state (that is, in a state in which the light source 110 does not emit a reference light pattern) in the low brightness irradiation state. In FIGS. 11A, 11B, and 11C, all image capture elements are in the high brightness irradiation state in an image capture time $T_1$ from a time point $t_{11}$ to a time point $t_{12}$, and all image capture elements are in the low brightness irradiation state in an image capture time $T_1$ from a time point $t_{21}$ to a time point $t_{22}$.

The image capture device 120 captures an image of the reference light pattern and the subject 140 in the high brightness irradiation state and outputs the first image signal to the control device 130, and captures an image of at least the subject 140 in the low brightness irradiation state (captures the image of the subject 140 in the low brightness irradiation state in Example 1) and outputs the second image signal to the control device 130. That is, the image capture device 120 captures the image of the reference light pattern and the subject 140 in the high brightness irradiation state to obtain the first image signal (see FIG. 2A). Further, the image capture device 120 captures the image of at least the subject 140 in the low brightness irradiation state to obtain the second image signal. Specifically, under the ambient light, the image of the subject 140 is captured to obtain the second image signal (see FIG. 2B). As an operation or a variety of processes of obtaining an image signal of the image capture device 120, and an operation or a variety of processes relating to transmission of an image signal to the control device 130, an operation and a processes which are known may be used. This is similarly applied to various examples described hereinafter. A temporal order in which the first image signal and the second signal are obtained is basically arbitrary, and for example, a configuration in which the first image signal is obtained after the second image signal is obtained may be used. The second image signal is stored in the frame memory 131.

Further, for example, after one image capture frame is terminated, the control device 130 generates a reference light pattern image signal from a difference between the first image signal and the second image signal. That is, the control device 130 performs a process of subtracting the second image signal stored in the frame memory 131 from the obtained first image signal.

Figure 14A:
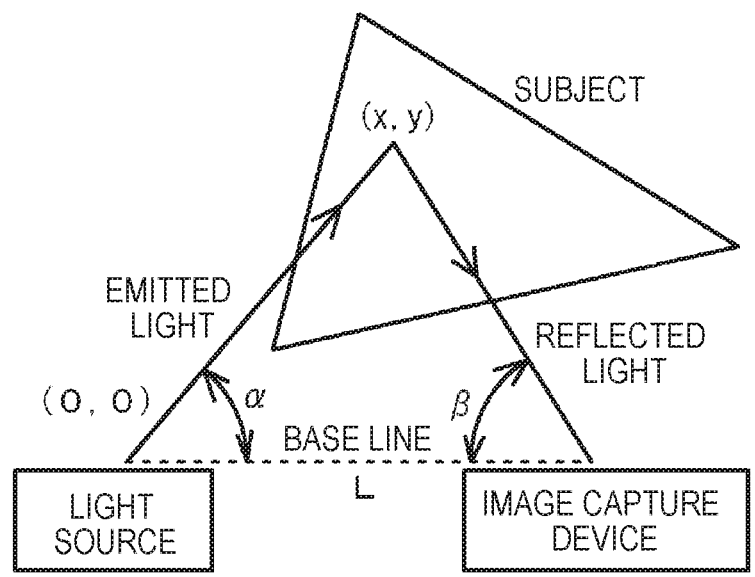
FIGS. 14A and 14B are conceptual diagrams showing arrangements of image capture devices or the like for describing an active stereo method and a stereo method, respectively.

The control signal 130 calculates angles $\alpha$ and $\beta$ shown in FIG. 14A from the obtained reference light pattern image signal, calculates coordinates (x, y) on the basis of Expression (A), and calculates a z coordinate. As a result, the control device 130 can calculate a distance from an image capture device to a subject, a two-dimensional shape or a three-dimensional shape of the subject, a motion of the subject, and the like, for example, on the basis of an active stereo method. A processing algorithm thereof may be a known processing algorithm. This is similarly applied to the various examples to be described hereinafter.

In Example 1, the second image signal is an image signal obtained in a state in which the reference light pattern is not present, and the first image signal is an image signal obtained in a state in which the reference light pattern is present. Accordingly, by calculating the difference between the first image signal and the second image signal, it is possible to obtain the reference light pattern image signal. That is, ambient light is included in either the first image signal or the second image signal. Accordingly, by calculating the difference between the first image signal and the second image signal, it is possible to remove the influence of the ambient light from the reference light pattern image signal. That is, it is possible to capture the reference light pattern by the image capture device without increasing the brightness of the reference light pattern. Further, it is possible to solve the problem such as increase in power consumption in the light source, and to solve the problem that the reference light pattern is visibly recognized according to circumstances. Furthermore, in a more free environment (in an environment that does not depend on indoor or outdoor illuminance, or in outdoor use), it is possible to measure the distance from the image capture device to the subject, the two-dimensional shape or the three-dimensional shape of the subject, the motion of the subject, and the like. Further, although the reference light pattern becomes dark in a subject located far from the light source or a subject with a wide angle of view, nonetheless, it is possible to reliably capture the reference light pattern by the image capture device, and to alleviate distance limitation. In addition, it is possible to reduce the light intensity of the light source, and thus, even in a case in which the light source is configured by a semiconductor laser device, for example, it is possible to secure high safety. This is similarly applied to the examples described hereinafter.

Example 2

Figure 1B:
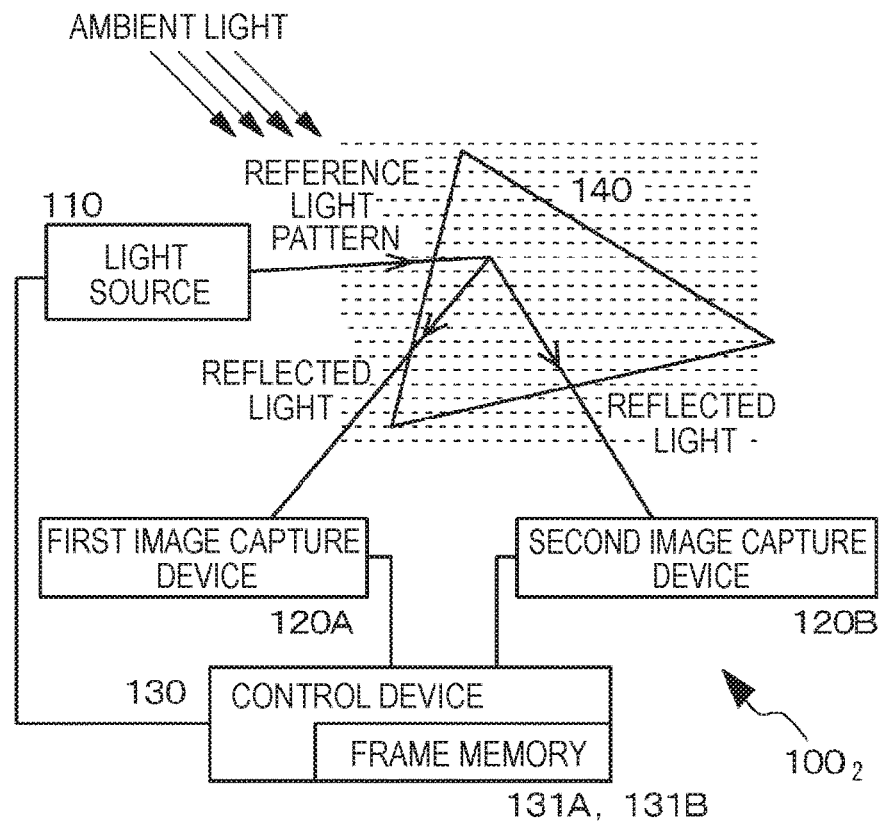
FIG. 1B is a conceptual diagram showing an image captured device assembly according to Example 2.

Example 2 is a modification of Example 1. As shown in a conceptual diagram of FIG. 1B, in an image capture device assembly $100_2$ of Example 2, the image capture device is configured by a stereo image capture device. Specifically, the image capture device is configured by a first image capture device 120A and a second image capture device 120B. That is, the light source 110 in the image capture device assembly of Example 1 is replaced with the first image capture device 120A, and the light source 210 is separately provided. A shutter mechanism in the image capture devices 120A and 120B may be any one of a global shutter mechanism and a rolling shutter mechanism.

Hereinafter, an overview of an image capture method using the image capture device assembly of Example 2 will be described. In the image capture method, for example, a distance from an image capture device to a subject, a two-dimensional shape or a three-dimensional shape of the subject, a motion of the subject, and the like are calculated on the basis of a stereo method.

Under the control of the control device 130, the light source 110 emits a reference light pattern toward the subject 140 with high brightness and low brightness, respectively. In Example 2, similar to Example 1, $T_1$ and $T_2$ are set to satisfy $T_1=T_2$, and the number of frames of images captured per second is 30 (image capture frame rate: 30 fps). Further, in the high brightness irradiation state, the light source 110 is set to be in an operation state (that is, in a state in which the light source 110 emits the reference light pattern), and in the low brightness irradiation state, the light source 110 is set to be in a non-operation state (that is, in a state in which the light source 110 does not emit the reference light pattern).

Each of the image capture devices 120A and 120B captures an image of the reference light pattern and the subject 140 in the high brightness irradiation state and outputs a first image signal to the control device 130, and captures an image of at least the subject 140 in the low brightness irradiation state (captures the image of the subject 140 in the low brightness irradiation state in Example 2) and outputs a second image signal to the control device 130. That is, each of the image capture devices 120A and 120B captures the image of the reference light pattern and the subject 140 in the high brightness irradiation state to obtain the first image signal (see FIG. 3A). The first image signal obtained from the first image capture device 120A is referred to as a "first signal-A", and the first image signal obtained from the second image capture device 120B is referred to as a "first image signal-B". Further, each of the image capture devices 120A and 120B captures the image of at least the subject 140 in the low brightness irradiation state to obtain the second image signal. Specifically, under ambient light, each of the image capture devices 120A and 120B captures the image of the subject 140 to obtain the second image signal (see FIG. 3B). The second image signal obtained from the first image capture device 120A is referred to as a "second signal-A", and the second image signal obtained from the second image capture device 120B is referred to as a "second image signal-B". The first image signal-A and the first image signal-B, and the second image signal-A and the second image signal-B are stored in frame memories 131A and 133B.

For example, after one image capture frame is terminated, the control device 130 generates reference light pattern image signals (a reference light pattern image signal-A obtained from the first image capture device 130A and a reference light pattern image signal-B obtained from the second image capture device 130B) from a difference between the first image signal-A and the second image signal-A, and a difference between the first image signal-B and the second image signal-B. That is, the control device 130 performs a subtraction process between the obtained first image signal-A and first image signal-B, and second image signal-A and second image signal-B.

Figure 14B:
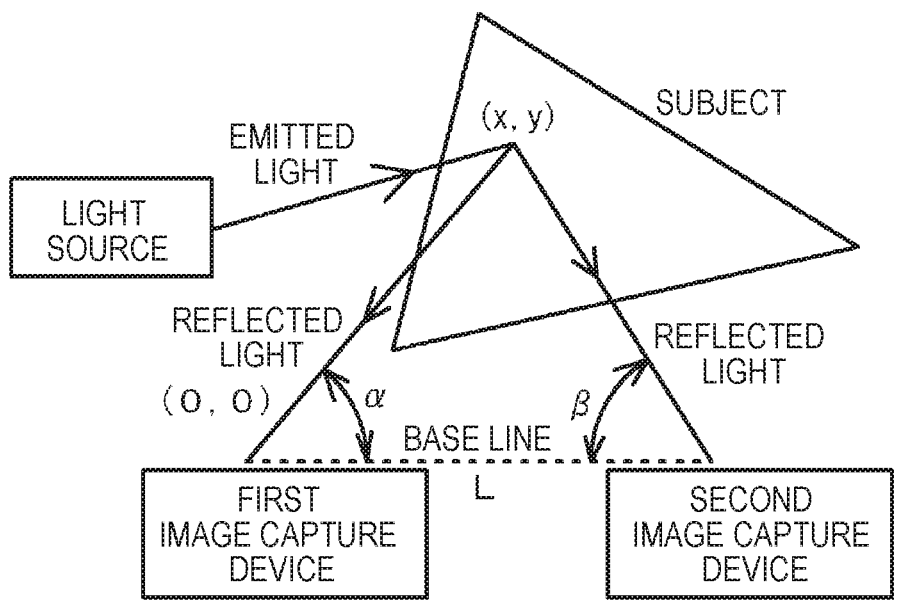

The control signal 130 calculates angles α and β shown in FIG. 14B from the obtained reference light pattern image signal-A and reference light pattern image signal-B, and further calculates coordinates (x, y) on the basis of Expression (A), and calculates a z coordinate. As a result, the control device 130 can calculate a distance from an image capture device to a subject, a two-dimensional shape or a three-dimensional shape of the subject, a motion of the subject, and the like, for example, on the basis of an active stereo method. A processing algorithm thereof may be a known processing algorithm. This is similarly applied to the various examples to be described hereinafter.

In Example 2, the second image signal-A and the second image signal-B are image signals obtained in a state in which the reference light pattern is not present, and the first image signal-A and the first image signal-B are image signals obtained in a state in which the reference light pattern is present. Accordingly, by calculating the difference between the first image signal-A and the second image signal-A, and the difference between the first image signal-B and the second image signal-B, it is possible to obtain the reference light pattern image signal-A and the reference light pattern image signal-B. Ambient light is included in any signal among the first image signal-A and first image signal-B, and the second image signal-A and the second image signal-B. Accordingly, by calculating the difference between the first image signal and the second image signal, it is possible to remove the influence of the ambient light from the reference light pattern image signal.

Example 3

Example 3 is a modification of Example 1 to Example 2. In Example 1 to Example 2, $T_1$ and $T_2$ are set to satisfy $T_1=T_2$. On the other hand, in Example 3, $T_1$ and $T_2$ are set to satisfy $T_1>T_2$. As a shutter mechanism, any one a global shutter mechanism and a rolling shutter mechanism may be used. FIGS. 12A, 12B, 13A, and 13B schematically show image capture times per image capture frame in a case in which a rolling shutter mechanism is used as the shutter mechanism. In the examples shown in FIGS. 12A, 12B, 13A, and 13B, the number of frames of images captured per second is set to 30 (image capture frame rate: 30 fps), and one image capture frame is divided into two or more periods, specifically, is equally divided into four periods. In the respective figures, a period from time point $t_{11}$ to time point $t_{12}$ corresponds to a high brightness irradiation state. Further, a period from time point $t_{21}$ to time point $t_{22}$ corresponds to a low brightness irradiation state.

Figure 12A:
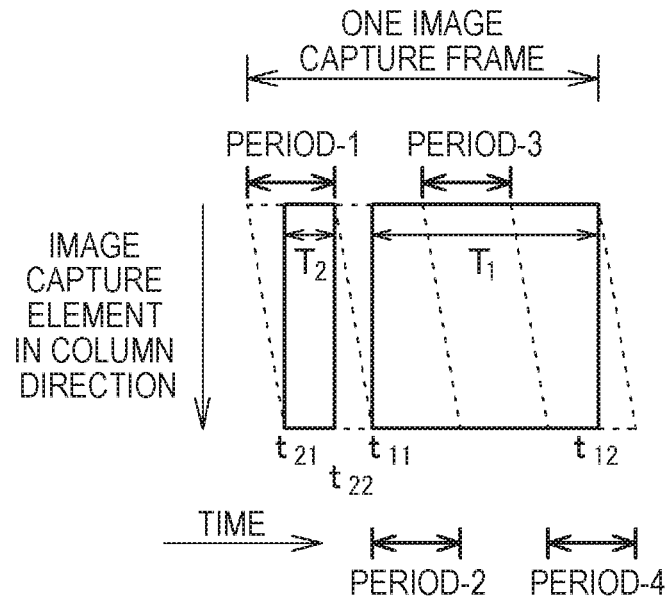
FIGS. 12A and 12B are diagrams schematically showing image capture times T1 and T2 per image capture frame.

In an example shown in FIG. 12A, a value of $T_1/T_2=Q$ exceeds 3, a part of "period-1" is in the low brightness irradiation state, a part of "period-2", the entirety of "period-3", and a part of "period-4" are in the high brightness irradiation state. In an example shown in FIG. 12B, a value of $T_1/T_2=Q$ is 3, a part of "period-1" is in the low brightness irradiation state, a part of "period-2", a part of "period-3", and a part of "period-4" are in the high brightness irradiation state. In an example shown in FIG. 13A, a value of $T_1/T_2=Q$ is 1, the entirety of "period-2" is in the high brightness irradiation state, and the entirety of "period-4" is in the low brightness irradiation state. In an example shown in FIG. 13B, a value of $T_1/T_2=Q$ exceeds 1, a part of "period-1", the entirety of "period-2", a part of "period-3", and the entirety of "period-4" are in the high brightness irradiation state, and the remaining part of "period-1" and the remaining part of "period-3" are in the low brightness irradiation state. On the basis of an instruction from a user of the image capture device assembly, the image capture times $T_1$ and $T_2$ can be made variable, and the ratio of $T_1$ and $T_2$ can be made variable.

Figure 12B:
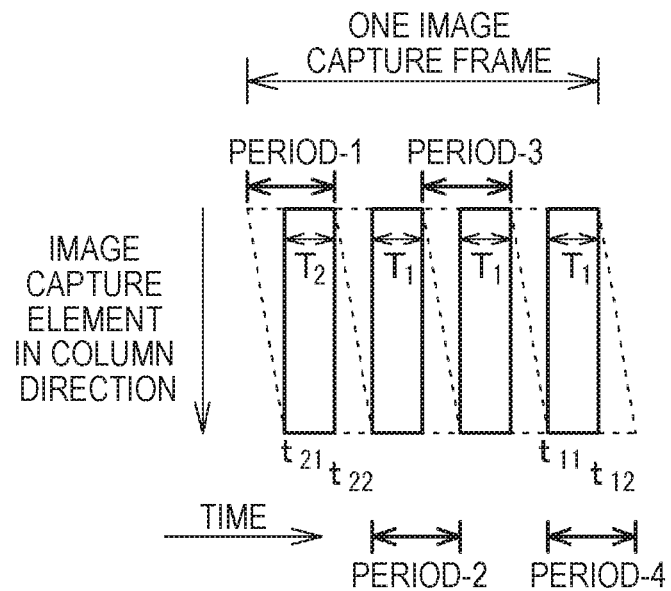
Figure 13A:
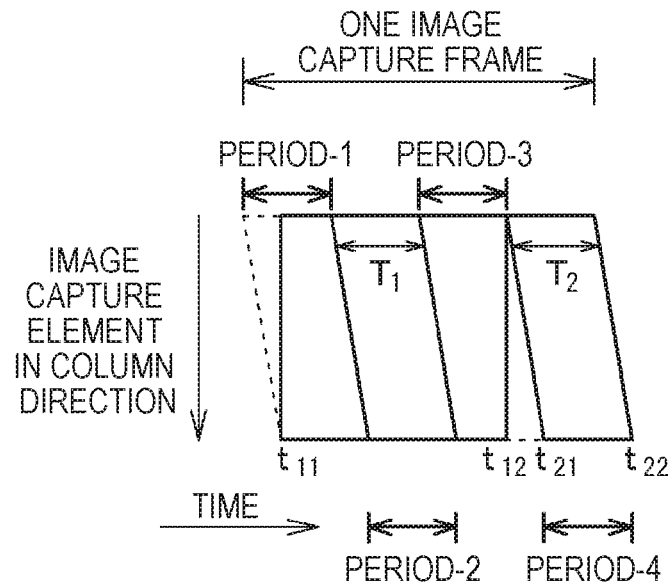
FIGS. 13A and 13B are diagrams schematically showing image capture times T1 and T2 per image capture frame.

In the examples shown in FIGS. 12A, 12B, and 13A, one image capture frame is divided into a plurality of periods, and one period therein is set to be in a low brightness irradiation state, and the remaining period is set to be in a high brightness irradiation state. Alternatively, in the examples shown in FIGS. 12A, 12B, 13A, and 13B, particularly, in the example shown in FIG. 13B, the image capture period during which the image of the reference light pattern and the subject is captured in the high brightness irradiation state and the image capture period during which the image of at least the subject is captured in the low brightness irradiation state are repeated, and the former image capture period is longer than the latter image capture period.

For example, in the example shown in FIG. 12A, the reference light pattern image signal can be obtained from the difference between the first image signal obtained from the time point $t_{11}$ to the time point $t_{12}$ and the second image signal obtained from the time point $t_{21}$ to the time point $t_{22}$, and is stored in the frame memory 131. Here, in order to obtain the reference light pattern image signal, it is necessary to perform the following correction.

(first image signal)−{2+(time length of period-3)/ (time length of $T_2$)}×(second image signal)

In the example shown in FIG. 12B, for example, the second image signal obtained in "period-1" may be stored in the frame memory 131, and the influence of ambient light may be removed from the reference light pattern image signal on the basis of a difference between the image signal obtained in "period-2" and the image signal obtained in "period-1", a difference between the image signal obtained in "period-3" and the image signal obtained in "period-1", and a difference between the image signal obtained in "period-4" and the image signal obtained in "period-1".

In the example shown in FIG. 13A, the second image signal obtained in "period-1" may be stored in the frame memory 131, and the influence of ambient light may be removed from the reference light pattern image signal on the basis of the difference between the image signal obtained in "period-3" and the image signal obtained in "period-1".

Figure 13B:
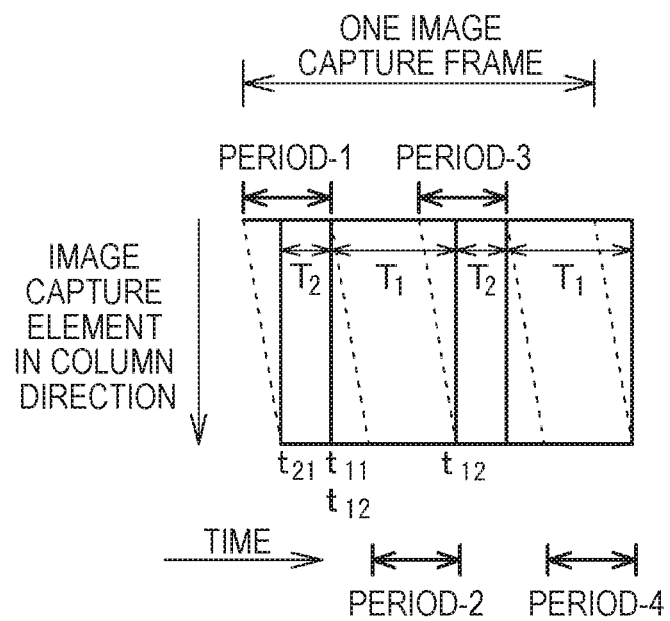

In the example shown in FIG. 13B, the second image signal obtained in "period-1" may be stored in the frame memory 131, and the influence of ambient light may be removed from the reference light pattern image signal on the basis of the difference between the first image signal and the second image signal, which are obtained in the part of "period-1", the entirety of "period-2", and the part of "period-3".

In a case in which it is difficult to obtain the reference light pattern image signal, it is preferable to increase the value of Q. Further, in a case in which ambient light is scarce, it is preferable to change and optimize the value of Q. For example, in a case in which the ambient light does not nearly exist, the value of Q may be set as an extremely large value, or Q may be set as ∞.

Further, in Example 3, a signal intensity of the first image signal becomes Q times a signal intensity of the second image signal according to circumstances. Accordingly, when the difference between the first image signal and the second image signal is calculated, the signal intensity of the second image signal may be set to be Q times, or the signal intensity of the first image signal may be set to be (1/Q) times.

Since the image capture device assembly or the image capture method of Example 3 may be configured to be similar to the image capture device assembly or the image capture method of Examples 1 to 2 except for the above-described points, detailed description thereof will not be repeated.

Example 4

Example 4 relates to an image capture device according to the second aspect of the present disclosure.

Figure 4A:
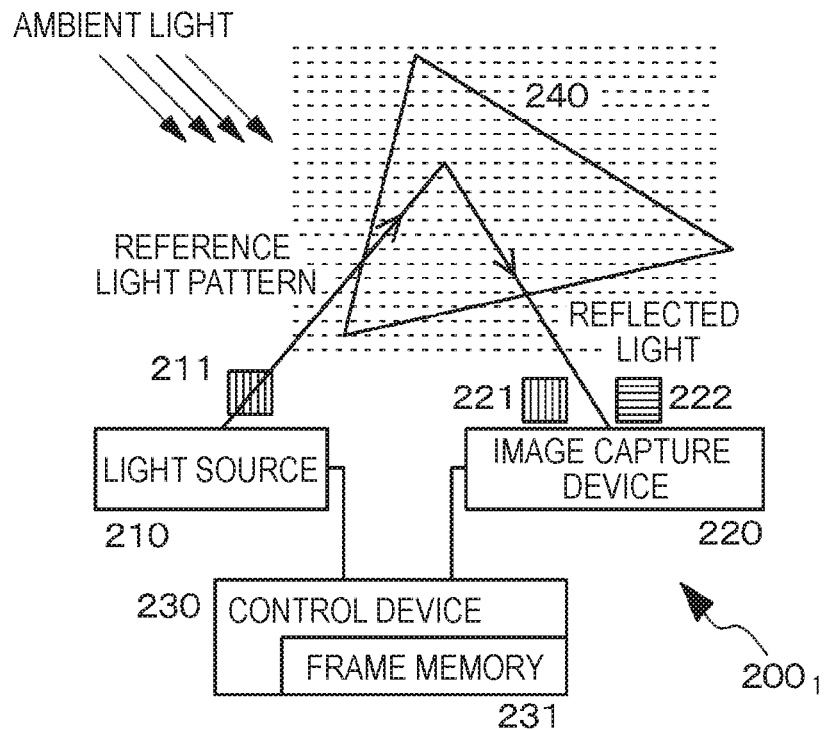
FIG. 4A is a conceptual diagram showing an image capture device assembly (an image capture device assembly according to a second aspect of the present disclosure) according to Example 4.

As shown in a conceptual diagram of FIG. 4A, an image capture device assembly $200_1$ of Example 4 includes the light source 210 that emits a reference light pattern which is polarized, an image capture device 220, and a control device 230 that controls the light source 210 and the image capture device 220. Further, the image capture device 220 includes a first polarizer 221 having a polarization axis in a direction parallel to a polarization direction of the reference light pattern, and a second polarizer 222 having a polarization axis in a direction perpendicular to the polarization direction of the reference light pattern. The image capture device 220 outputs a first image signal obtained on the basis of polarized light passed through the first polarizer 221 to the control device 230, and outputs a second image signal obtained on the basis of polarized light passed through the second polarizer 222 to the control device 230. The control device 230 generates a reference light pattern image signal from a difference between the first image signal and the second image signal. In the figure, the polarizers 221 and 222 are indicated by a figure in which a plurality of thin lines are surrounded by a rectangle. A direction in which the plurality of thin lines extend represents the polarization axis.

Figure 8A:
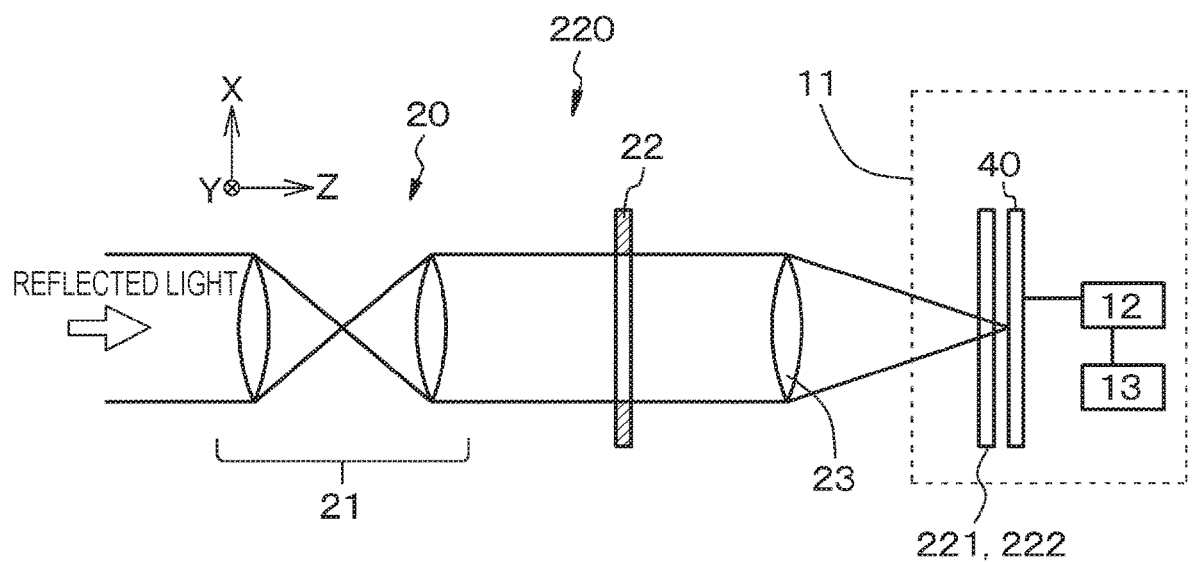
FIGS. 8A and 8B are a conceptual diagram showing the image capture device assembly according to Example 4 and a diagram schematically showing a state of polarization using a first polarizer and a second polarizer, respectively.
Figure 8B:
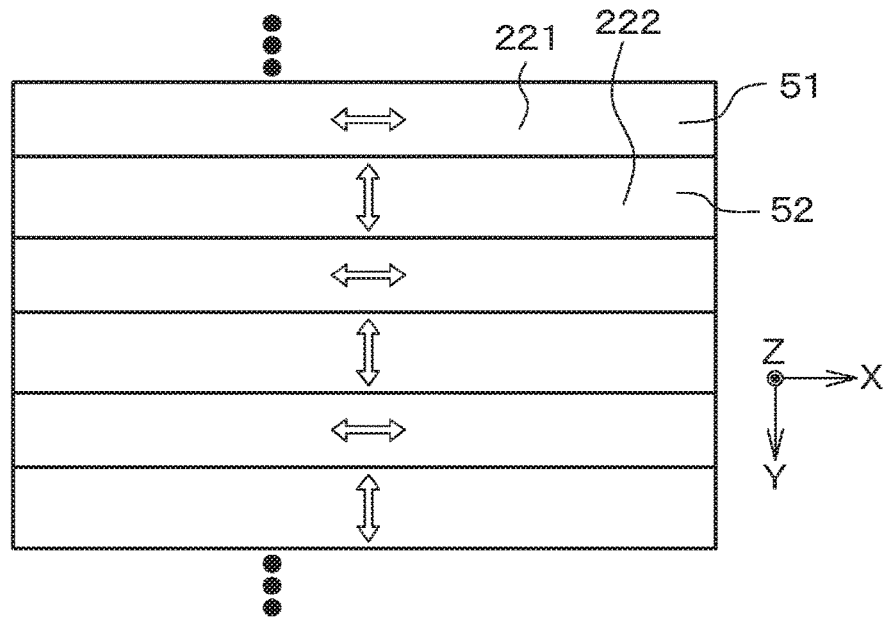
Figure 9A:
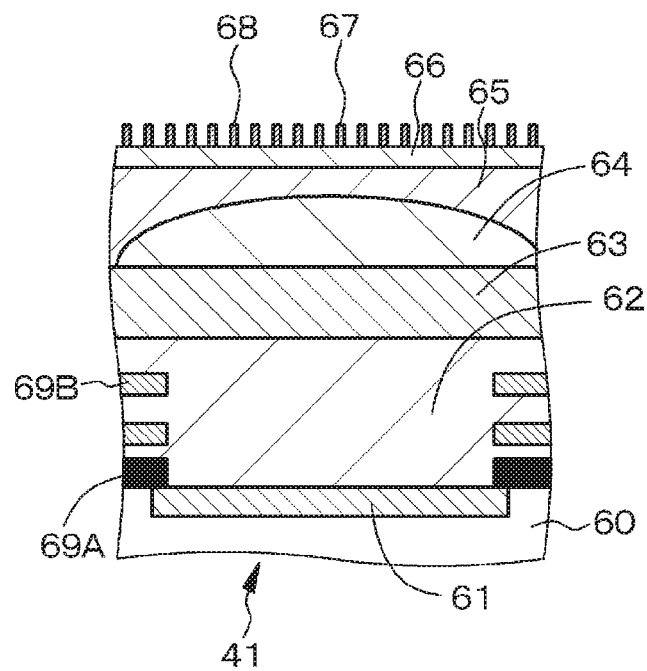
FIGS. 9A and 9B are a partial sectional view schematically showing an image capture element in an image capture device that forms the image capture device assembly according to Example 4 and a diagram schematically showing an arrangement state of wire grid polarizers.
Figure 9B:
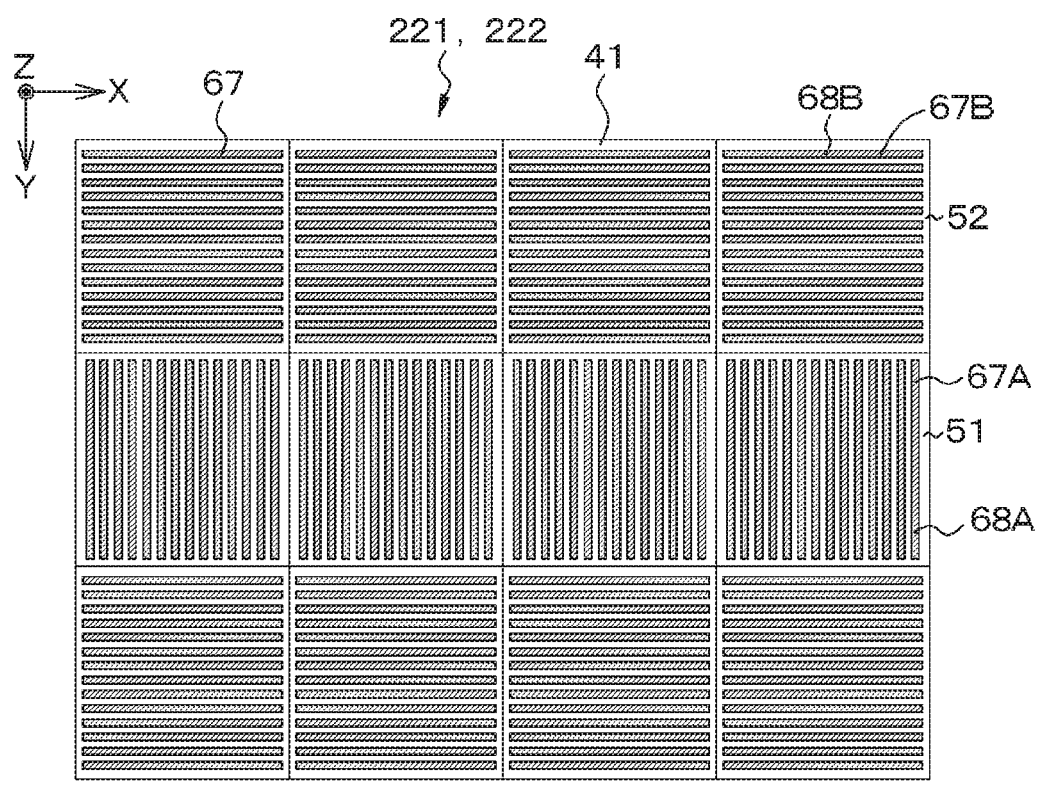
Figure 10:
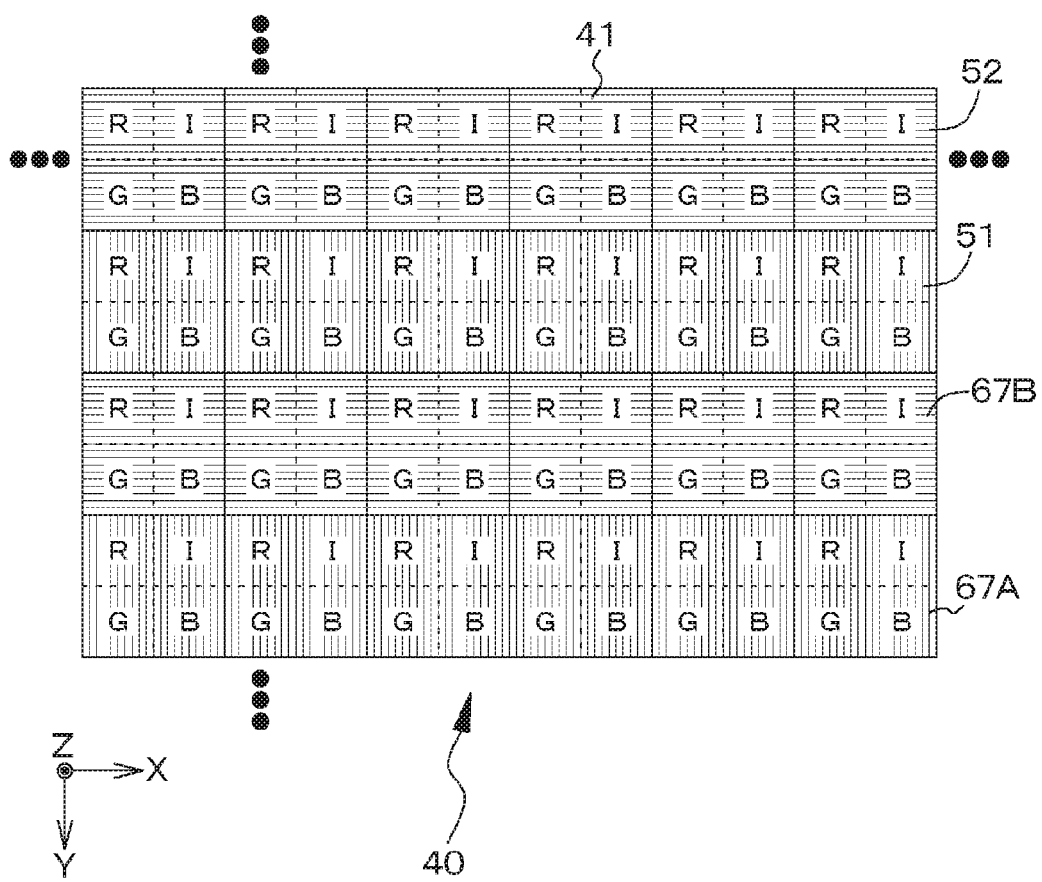
FIG. 10 is a conceptual diagram showing an image capture element array having a Bayer array in the image capture device that forms the image capture device assembly according to Example 4.

A conceptual diagram of the image capture device 220 that forms the image capture device assembly $200_1$ of Example 4 is shown in FIG. 8A, and a state of polarization based on the first polarizer 221 and the second polarizer 222 is schematically shown in FIG. 8B. Further, a partial sectional view of an image capture element in the image capture device 220 is schematically shown in FIG. 9A, and an arrangement state of wire grid polarizers is schematically shown in FIG. 9B. In addition, a conceptual diagram of an image capture element array having the Bayer array in the image capture device 220 is shown in FIG. 10. In the following description, a light progressing direction is referred to as a Z-axial direction, a direction parallel to a reference light pattern polarization direction is referred to as an X-axial direction, and a direction perpendicular to the reference light pattern polarization direction is referred to as a Y-axial direction.

The image capture device of Example 4, or Examples 5 and 6 (which will be described later) includes a lens system 20 that condenses light from a subject, and an image capture element array 40 in which image capture elements 41 are arranged in a two-dimensional matrix form in the X-axial direction and the Y-axial direction, and the image capture element array 40 configured to include the first polarizer 221 and the second polarizer 222 on a light incidence side and to convert the light condensed by the lens system 20 into an electric signal. An extinction ratio of each polarizer 221 or 222 is, for example, equal to or greater than 3, more specifically, is equal to or greater than 10.

Here, the lens system 20 includes an image capture lens 21, a diaphragm 22, and an imaging lens 23, for example, and functions as a zoom lens. The image capture lens 21 is a lens for condensing incident light from a subject. The image capture lens 21 includes a focus lens for focusing, a zoom lens for enlarging the subject, or the like, and generally, is realized by a combination of a plurality of lens for correcting chromatic aberration or the like. The diaphragm 22 has a function for narrowing down to adjust the intensity of condensed light, and generally, is configured by combining a plurality of plate-like wings (blades). At least at the position of the diaphragm 22, light from one point on a subject becomes parallel light. The imaging lens 23 image-forms light on the image capture element array 40. The image capture element array 40 is disposed in the camera main body 11. In the above-described configuration, an incident pupil is disposed closer to the camera main body than to the imaging lens 23. For example, a digital still camera, a video camera, or a camcorder is configured by the image capture device.

The camera main body 11 includes an image processing unit 12 and an image storage unit 13, for example, in addition to the image capture element array 40. The image capture element array 40 is realized by a CMOS image sensor, or the like, for example. The image processing unit 12 converts an electric signal output from the image capture element array 40 into image data, and stores the converted image data in the image storage unit 13.

As shown in FIG. 9A which is a diagram showing the schematic partial sectional view and FIG. 9B which is a diagram showing the arrangement state of the wire grid polarizers 67 that form the first polarizer 221 and the second polarizer 222, the image capture element 41 is configured so that a photoelectric conversion element 61 is provided on a silicon semiconductor substrate 60, and a first flattening film 62, a color filter 63, an on-chip lens 64, a second flattening film 65, an inorganic insulating ground layer 66, and a wire grid polarizer 67 are layered thereon, for example. Reference numerals 69A and 69B represent a light shielding layer and an interconnect layer. Further, the wire grid polarizer 67 forms a first area 51 and a second area 52, respectively. In FIG. 9B, a boundary area of pixels is indicated by a solid line. A direction in which a plurality of wires 68 that form the wire grid polarizers 67 extend is parallel to the X-axial direction or the Y-axial direction. Specifically, an extending direction of wires 68A is parallel to the Y-axial direction, in wire grid polarizers 67A that form the first polarizer 221 and form the first area 51, and an extending direction of wires 68B is parallel to the X-axial direction, in wire grid polarizers 67B that form the second polarizer 222 and form the second area 52. The extending direction of the wires 68 becomes a light absorption axis in the wire grid polarizers 67, and a direction perpendicular to the extending direction of the wires 68 becomes a light transmission axis (polarization axis) in the wire grid polarizers 67. A polarization state of a first area transmission light passed through the first area 51 and a polarization state of a second area transmission light passed through the second area 52 are different from each other.

In addition, it is possible to obtain the first image signal by the first area transmission light that passes through the first area 51 and reaches the image capture element 41, and to obtain the second image signal by the second area transmission light that passes through the second area 52 and reaches the image capture element 41.

As shown in the conceptual diagram of FIG. 10, the image capture device array 40 has the Bayer array, in which one pixel is configured by four image capture elements (one red image capture element "R" that receives red light, one blue image capture element "B" that receives blue light, one green image capture element "G" that receives green light, and one infrared image capture element "I" that receives infrared light). Further, the first area 51 is disposed with respect to one row pixel group which is arranged along the X-axial direction, and similarly, the second area 52 is disposed with respect to one row pixel group that is contiguous to the former row pixel group in the Y-axial direction and are arranged along the X-axial direction. The first area 51 and the second area 52 are alternately arranged along the Y-axial direction. The first area 51 and the second area 52 generally extend in the X-axial direction, and unit lengths of the first area 51 and the second area 52 along the X-axial direction and the Y-axial direction are equal to the lengths of the image capture element 41 along the X-axial direction and the Y-axial direction. With such a configuration, the first image signal and the second image signal are alternately generated along the Y-axial direction. In FIG. 10, vertical lines are assigned inside the first area 51, and horizontal lines are assigned inside the second area 52, but those lines schematically show wires of the wire grid polarizers 67A and 67B.

As described above, the first image signal and the second image signal are generated in a kind of toothless state along the Y-axial direction. Thus, in order to create image data, the image processing unit 12 performs de-mosaic processing with respect to an electric signal, and for example, performs interpolation processing based on super resolution processing, to thereby generate and create final image data. Further, image data at each image capture element position can be obtained by the de-mosaic processing, but in this stage, as described above, the first and second image signals are in the kind of toothless state. Thus, with respect to an area where image data is not present, it is necessary to generate image data through interpolation. As a method for the interpolation, a known method such as a method of using an addition average value of neighboring values may be exemplified. The interpolation processing may be performed in parallel with the de-mosaic processing. Since image quality is completely maintained in the X-axial direction, image quality deterioration such as resolution lowering of the whole image is relatively small.

The above-described configurations and structures of the image capture device may be applied to the image capture device 120 in Examples 1 to 3, except that the polarizers 221 and 222 are not provided. Further, in an image capture device in Example 6 (which will be described later), for example, a film-shaped or sheet-shaped first polarizer 223 may be disposed on a light incidence side of the lens system 20 that forms a first image capture device 220C, and a film-shaped or sheet-shaped second polarizer 224 may be disposed on the light incidence side of the lens system 20 that forms a second image capture device 220D.

An image capture device assembly $200_2$ of Example 4 includes one image capture device 220. A shutter mechanism in the image capture device 220 may be any one of a global shutter mechanism and a rolling shutter mechanism. In order to obtain a polarized reference light pattern, a polarizer 211 is disposed on a light emission side of the light source 210. In a case in which light itself emitted from the light source is polarized, the polarizer may not be disposed on the light emission side of the light source 210.

Hereinafter, an overview of an image capture method using an image capture device assembly of Example 4 will be described. In the image capture method, for example, a distance from an image capture device to a subject, a two-dimensional shape or a three-dimensional shape of the subject, a motion of the subject, and the like are calculated on the basis of an active stereo method. In Examples 4 to 6, the number of frames of images captured per second is set to 30 (30 fps).

Under the control of the control device 230, the light source 210 emits a polarized reference light pattern toward a subject 240 with a predetermined brightness. That is, the light source 210 irradiates the subject 240 with the polarized reference light pattern.

Figure 5A:
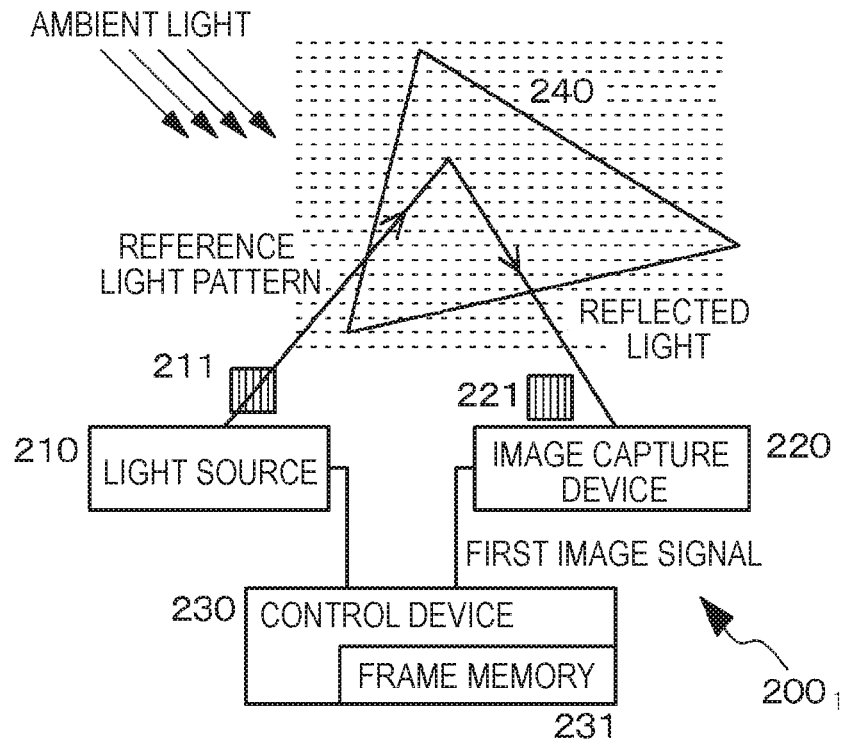
FIGS. 5A and 5B are diagrams schematically showing a state in which a first image signal is acquired and a state in which a second image signal is acquired, respectively, in the image capture device assembly according to Example 4.
Figure 5B:
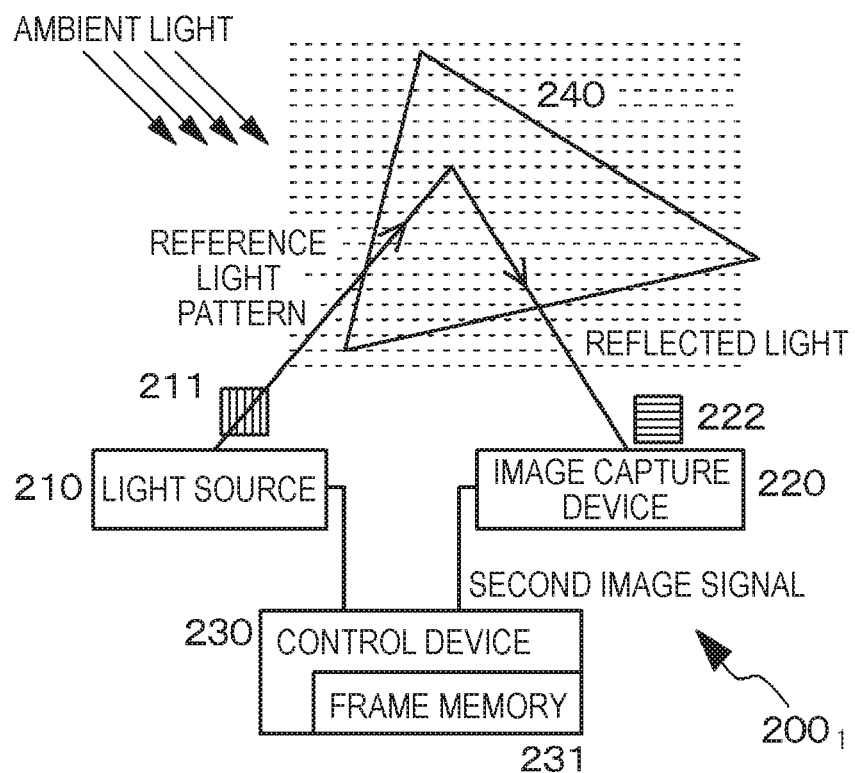

When the light source 210 is in an operation state (that is, a state in which the light source 210 emits the reference light pattern), the image capture device 220 captures an image of the reference light pattern and the subject 240 and outputs a first image signal to the control device 230 (see FIG. 5A). At the same time, the image capture device 220 captures an image of the subject 240 and outputs a second image signal to the control device 230 (see FIG. 5B). That is, the image capture device 220 obtains the first image signal on the basis of polarized light which is polarized in a direction parallel to a polarization direction of the reference light pattern. Further, the image capture device 220 obtains the second mage signal on the basis of polarized light which is polarized in a direction perpendicular to the polarization direction of the reference light pattern (on the basis of light that does not depend on the polarization direction, as necessary). The second image signal does not include an image signal based on the reference light pattern. The first image signal and the second image signal are stored in the frame memory 231.

Further, for example, after one image capture frame is terminated, the control device 230 generates a reference light pattern image signal from a difference between the first image signal and the second image signal. That is, the control device 230 performs a process of subtracting the second image signal from the obtained first image signal. Since the polarization state varies, for example, even in a state in which the reference light pattern is not irradiated, the first image signal and the second image signal obtained from the subject including the influence of ambient light do not become the same value. Accordingly, when merely calculating the difference between the first image signal and the second image signal, a difference between the first image signal and the second image signal in which image signals that vary due to the polarization state are included is obtained. Accordingly, it is necessary to remove the image signals due to the polarization state from the difference between the first image signal and the second image signal.

Specifically, in order to obtain the difference between the first image signal and the second image signal, a process of irradiating the subject 240 with the reference light pattern and obtaining the first image signal on the basis of polarized light passed through the first polarizer 221 (referred to as a "reference light pattern irradiation process") is performed. On the other hand, a process of obtaining the first image signal on the basis of polarized light passed through the first polarizer 221 at a certain frequency without irradiating the subject 240 with the reference light pattern is performed (referred to as a "non-reference light pattern irradiation process"). Further, using a difference between the first image signal and the second image signal obtained in the non-reference light pattern irradiation process as a reference difference, by further subtracting the reference difference from the difference between the first image signal and the second image signal in the reference light pattern irradiation process, it is possible to remove signals due to the polarization state. Here, a process of removing the signals due to the polarization state is not limited to the above-described process.

The control device 230 calculates coordinates (x, y) from the obtained reference light pattern image signal, in a similar way to the description in Example 1, and calculates a z coordinate. As a result, the control device 230 can calculate a distance from an image capture device to a subject, a two-dimensional shape or a three-dimensional shape of the subject, a motion of the subject, and the like, for example, on the basis of an active stereo method.

In Example 4, the second image signal is an image signal obtained on the basis of polarized light passed through the second polarizer (an image signal that does not include an image signal based on the reference light pattern), and the first image signal is an image signal obtained on the basis of polarized light passed through the first polarizer (an image signal including the image signal based on the reference light pattern). Accordingly, by calculating a difference between the first image signal and the second image signal, it is possible to obtain a reference light pattern image signal. Ambient light is included in either the first image signal or the second image signal. Accordingly, by calculating the difference between the first image signal and the second image signal, it is possible to remove the influence of the ambient light from the reference light pattern image signal. In addition, application of a polarization state is effective in a case in which it is difficult to provide a mechanism that changes a reference light pattern into a high brightness irradiation pattern and a low brightness irradiation pattern, or for example, in a case in which electromagnetic noise or the like generated by the change causes inconvenience or a case in which it is difficult to apply such modulation to a light source.

Example 5

Figure 4B:
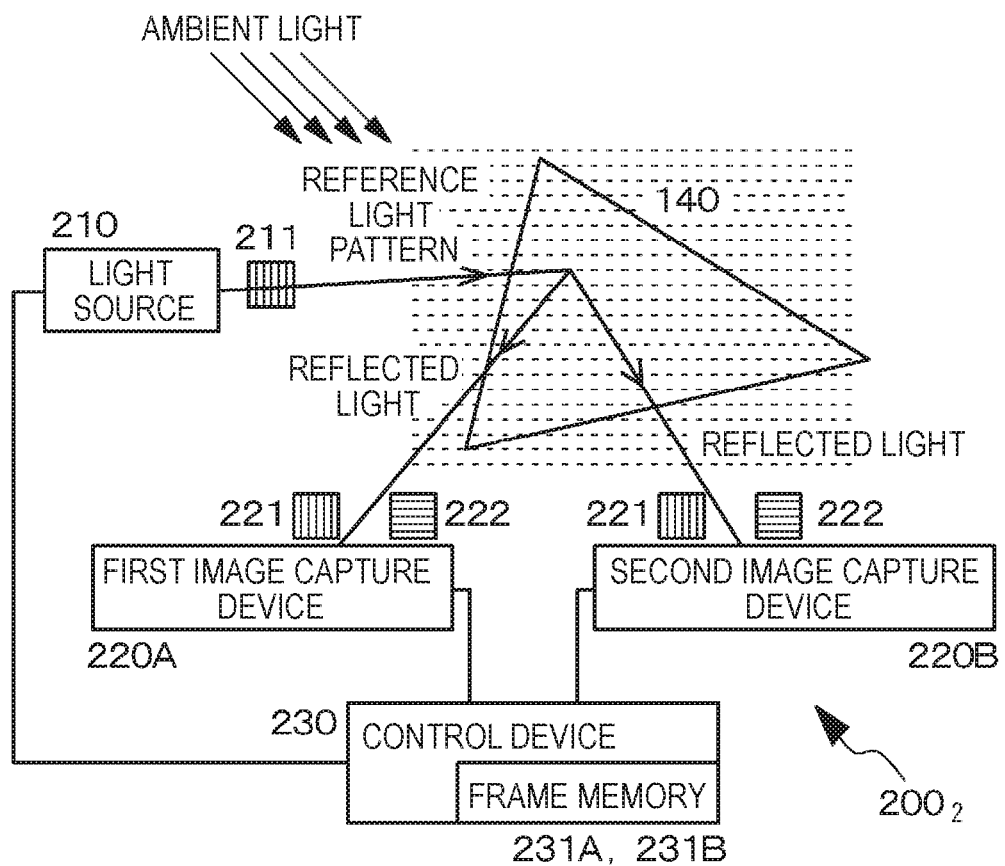
FIG. 4B is a conceptual diagram showing an image captured device assembly according to Example 5.

Example 5 is a modification of Example 4. As shown in a conceptual diagram of FIG. 4B, in an image capture device assembly 200₂ of Example 5, an image capture device is configured by a stereo image capture device. Specifically, the image capture device is configured by a first image capture device 220A and a second image capture device 220B. A shutter mechanism in the image capture devices 220A and 220B may be any one of a global shutter mechanism and a rolling shutter mechanism. The first image capture device 220A and the second image capture device 220B have the same configuration and structure as in the image capture device 220 described in Example 4.

Hereinafter, an overview of an image capture method using the image capture device assembly of Example 5 will be described. In the image capture method, for example, a distance from an image capture device to a subject, a two-dimensional shape or a three-dimensional shape of the subject, a motion of the subject, and the like are calculated on the basis of a stereo method.

Under the control of the control device 230, the light source 210 emits polarized reference light pattern to the subject 240. That is, the light source 210 irradiates the subject 240 with the polarized reference light pattern.

Figure 6A:
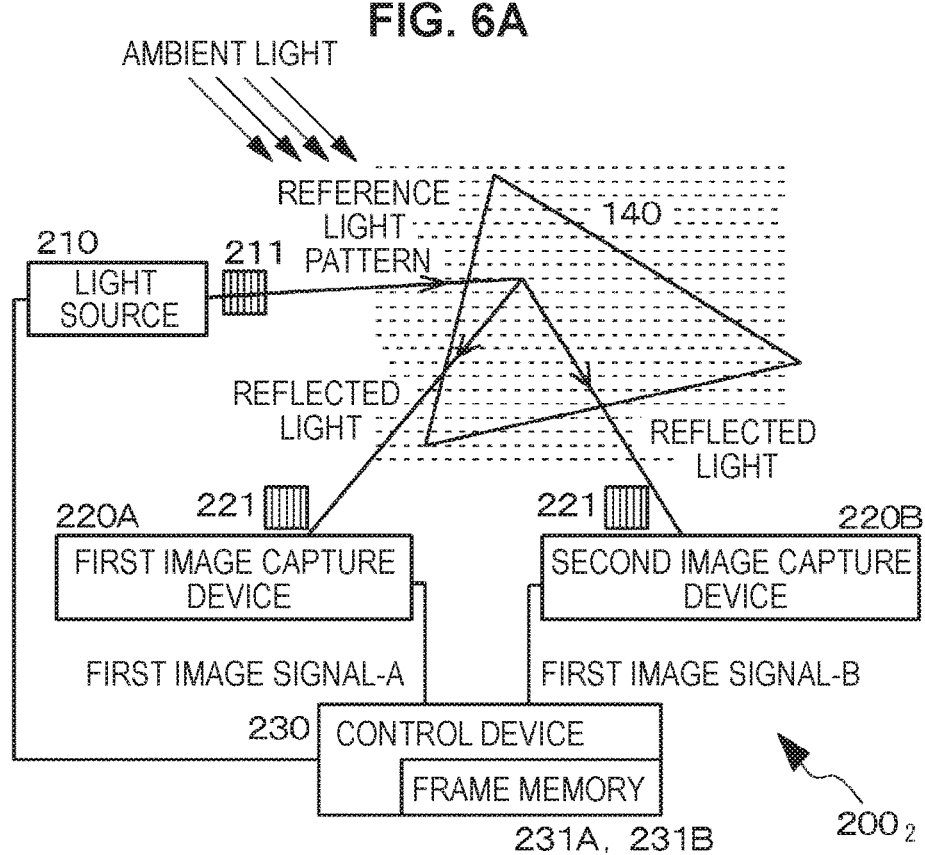
FIGS. 6A and 6B are diagrams schematically showing a state in which a first image signal is acquired and a state in which a second image signal is acquired, respectively, in the image capture device assembly according to Example 5.
Figure 6B:
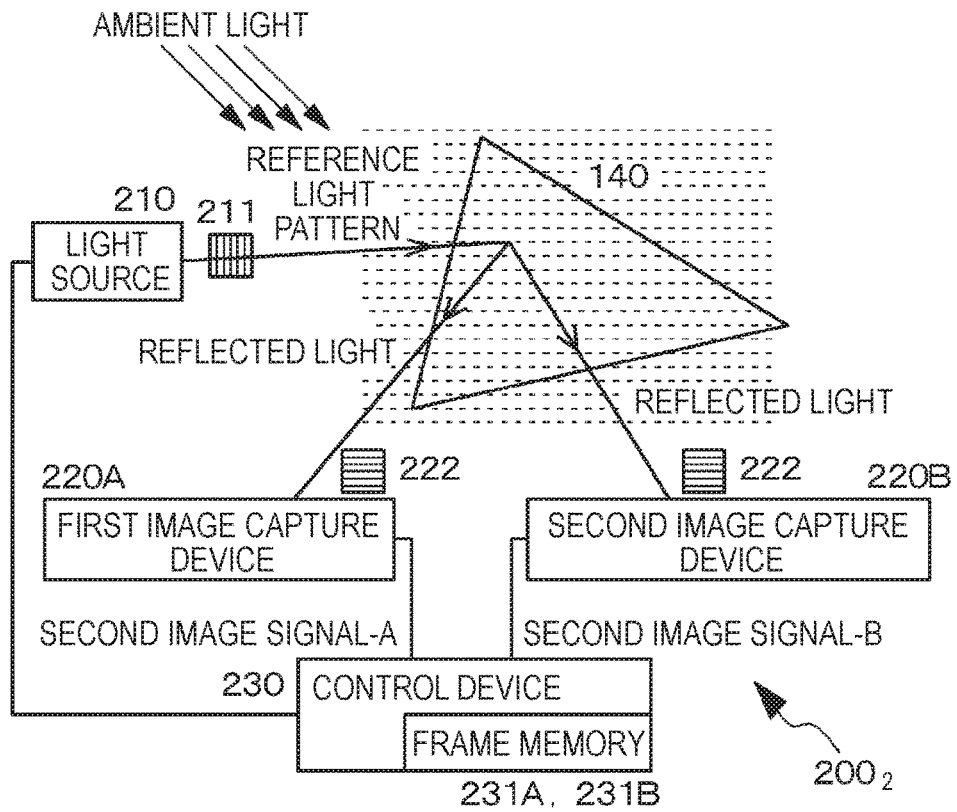

The first image capture device 220A outputs a first image signal and a second image signal to the control device 230, and also, the second image capture device 220B outputs a first image signal and a second image signal to the control device 230 (see FIGS. 6A and 6B). The first image signal obtained from the first image capture device 220A is referred to as a "first image signal-A", and the first image signal obtained from the second image capture device 220B is referred to as a "first image signal-B". Further, the second image signal obtained from the first image capture device 220A is referred to as a "second image signal-A", and the second image signal obtained from the second image capture device 220B is referred to as a "second image signal-B". The first image signal-A and the first image signal-B, and the second image signal-A and the second image signal-B are stored in frame memories 231A and 231B.

Further, for example, after one image capture frame is terminated, the control device 230 generates a reference light pattern image signal (a reference light pattern image signal-A obtained from the first image capture device 230A and a reference light pattern image signal-B obtained from the second image capture device 230B) from a difference between the first image signal-A and the second image signal-A, and a difference between the first image signal-B and the second image signal-B. That is, the control device 230 performs a subtraction process between the obtained first image signal-A and the first image signal-B, and the second image signal-A and the second image signal-B. This process may be the same as the process described in Example 4.

The control signal 230 calculates angles α and β shown in FIG. 14B from the obtained reference light pattern image signal-A and reference light pattern image signal-B, calculates coordinates (x, y) on the basis of Expression (A), and calculates a z coordinate. As a result, the control device 230 can calculate a distance from an image capture device to a subject, a two-dimensional shape or a three-dimensional shape of the subject, a motion of the subject, and the like, for example, on the basis of the stereo method.

In Example 5, the second image signal-A and the second image signal-B are image signals obtained in a state in which a reference light pattern is not present (or in a state in which the presence of the reference light pattern is ignored due to polarization), and the first image signal-A and the first image signal-B are image signals obtained in a state in which the reference light pattern is present. Accordingly, by calculating the difference between the first image signal-A and the second image signal-A, and the difference between the first image signal-B and the second image signal-B, it is possible to obtain a reference light pattern image signal-A and a reference light pattern image signal-B. Ambient light is included in either the first image signal-A, the first image signal-B, the second image signal-A, and the second image signal-B. Accordingly, by calculating the difference between the first image signal and the second image signal, it is possible to remove the influence of the ambient light from the reference light pattern image signal.

Further, calculation can be performed on the basis of an active stereo method by using the first image capture device 220A and the light source 210, for example.

Example 6

Figure 7:
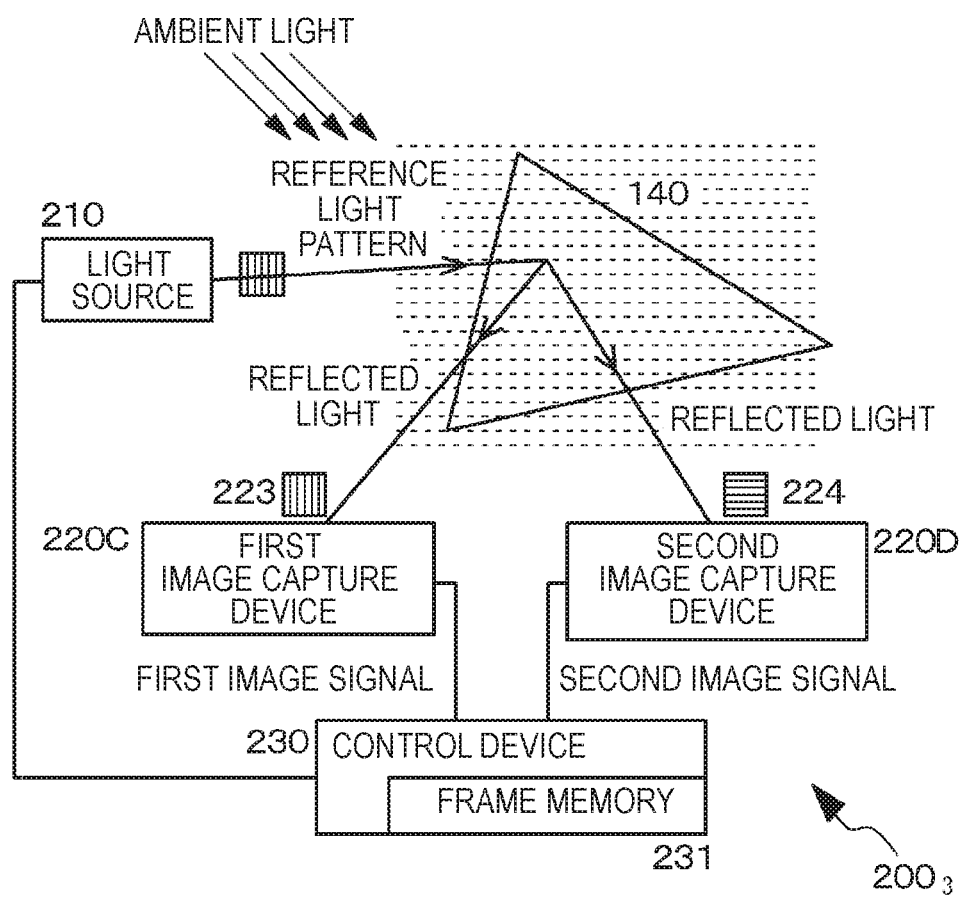
FIG. 7 is a conceptual diagram showing an image capture device assembly according to Example 6, which is a diagram schematically showing a state in which a first image signal is acquired and a state in which a second image signal is acquired.

Example 6 is also a modification of Example 4. As shown in a conceptual diagram of FIG. 7, in an image capture device assembly $200_3$ of Example 6, an image capture device is configured by two image capture devices 220C and 220D. However, unlike Example 5, it is not necessary to configure a stereo image capture device by two image capture devices 220C and 220D. Further, unlike Example 5, a first polarizer 223 having a polarization axis in a direction parallel to a polarization direction of a reference light pattern is provided in the first image capture device 220C, and a second polarizer 224 having a polarization axis in a direction perpendicular to the polarization direction of the reference light pattern is provided in the second image capture device 220D. A first image signal is obtained by the first image capture device 220C, and a second image signal is obtained by the second image capture device 220D. A shutter mechanism in the image capture devices 220C and 220D may be any one of a global shutter mechanism and a rolling shutter mechanism.

Hereinafter, an overview of an image capture method using the image capture device assembly of Example 6 will be described. In the image capture method, for example, a distance from an image capture device to a subject, a two-dimensional shape or a three-dimensional shape of the subject, a motion of the subject, and the like are calculated on the basis of an active stereo method.

Under the control of the control device 230, the light source 210 emits polarized reference light pattern toward the subject 240. That is, the light source 210 irradiates the subject 240 with the polarized reference light pattern. In Example 6, unlike Examples 4 and 5, it is possible to obtain the first image signal by the first image capture device 220C on the basis of polarized light passed through the first polarizer 223, and at the same time, it is possible to obtain the second image signal by the second image capture device 220D on the basis of polarized light passed through the second polarizer 224.

Each of the image capture devices 220C and 220D outputs the first image signal and the second image signal to the image capture device 230. The control device 230 generates a reference light pattern image signal from a difference between the first image signal and the second image signal. That is, the control device 230 performs a process of subtracting the second image signal from the obtained first image signal. This process may be the same as the process described in Example 4.

The control signal 230 calculates angles α and β shown in FIG. 14A from the obtained reference light pattern image signal, further calculates coordinates (x, y) on the basis of Expression (A), and calculates a z coordinate. As a result, the control device 230 can calculate a distance from an image capture device to a subject, a two-dimensional shape or a three-dimensional shape of the subject, a motion of the subject, and the like, for example, on the basis of the stereo method.

In Example 6, the second image signal is an image signal obtained in a state in which a reference light pattern is not present (or in a state in which the presence of the reference light pattern is ignored due to polarization), and the first image signal is an image signal obtained in a state in which the reference light pattern is present. Accordingly, by calculating a difference between the first image signal and the second image signal, it is possible to obtain a reference light pattern image signal. Ambient light is included in either the first image signal or the second image signal. Accordingly, by calculating the difference between the first image signal and the second image signal, it is possible to remove the influence of the ambient light from the reference light pattern image signal.

It goes without saying that the present disclosure has been described on the basis of the preferred examples, whilst the present disclosure is not limited to the above examples. The configurations of the image capture device assembly, the image capture device, the light source, and the control device described in the examples, or configurations of structures thereof are merely illustrative, and are appropriately changeable. Further, in the examples, various values are shown, but they are illustrative, and for example, if specifications of a light source, an image capture, and a control device to be used are changed, it is natural that they are changed. The image capture device assembly described in Examples 2 to 6 may be applied to the three-dimensional shape measurement device or the motion detection device.

Additionally, the present technology may also be configured as below.

[A01] <<Image Capture Device: First Aspect>>
An image capture device assembly including:
a light source that emits a reference light pattern;
an image capture device; and
a control device that controls the light source and the image capture device,
wherein the light source emits the reference light pattern to a subject with high brightness and low brightness, respectively, under the control of the control device,
the image capture device captures an image of the reference light pattern and the subject in a high brightness irradiation state and outputs a first image signal to the control device, or captures an image of at least the subject in a low brightness irradiation state and outputs a second image signal to the control device, and
the control device generates a reference light pattern image signal from a difference between the first image signal and the second image signal.

[A02]
The image capture device assembly according to [A01], wherein the control device includes a frame memory, and any one of the first image signal and the second image signal is stored in the frame memory.

[A03]
The image capture device assembly according to [A01] or [A02]
wherein when an image capture time in capturing the image of the reference light pattern and the subject in the high brightness irradiation state is represented as $T_1$, and an image capture time in capturing the image of at least the subject in the low brightness irradiation state is represented as $T_2$, $T_1 > T_2$ is satisfied.

[A04]
The image capture device assembly according to [A03], wherein the image capture times $T_1$ and $T_2$ are made variable, or ratio of $T_1/T_2$ is made variable, on a basis of an instruction from a user of the image capture device assembly.

[A05]
The image capture device assembly according to [A01] or [A02],
wherein one image capture frame is divided into a plurality of periods,
one of the plurality of periods is set to be in the low brightness irradiation state, and
the other periods are set to be in the high brightness irradiation state.

[A06]
The image capture device assembly according to [A05], wherein the image capture frame rate is 30 frames per second, and
one image capture frame is divided into two or more periods.

[A07]
The image capture device assembly according to [A01] or [A02],
wherein an image capture period during which the image of the reference light pattern and the subject is captured in the high brightness irradiation state and an image capture period during which the image of at least the subject is captured in the low brightness irradiation state are repeated, and the former image capture period is longer than the latter image capture period.

[A08]
The image capture device assembly according to any one of [A01] to [A07],
wherein the image capture device includes image capture elements which are arranged in a first direction and a second direction in a two-dimensional matrix form;
the image capture device includes a rolling shutter mechanism; and
the control device controls the light source and the image capture device so that all the image capture elements capture the image of the reference light pattern and the subject in the high brightness irradiation state and output the first image signals to the control device, and all the image capture elements capture the image of at least the subject in the low brightness irradiation state and output the second image signals to the control device.

[A09]
The image capture device assembly according to any one of [A01] to [A08],
wherein the light source is in an operation state in the high brightness irradiation state, and the light source is in a non-operation state in the low brightness irradiation state.

[A10]
The image capture device assembly according to any one of [A01] to [A09], including
one image capture device.

[A11]
The image capture device assembly according to [A10], wherein the control device calculates a distance from the image capture device to the subject from the obtained reference light pattern image signal, on the basis of an active stereo method.

[A12]
The image capture device assembly according to any one of [A01] to [A09],
wherein the image capture device is implemented by a stereo image capture device.

[A13]
The image capture device assembly according to [A12], wherein the control device calculates a distance from the image capture device to the subject from the obtained reference light pattern image signal, on the basis of a stereo method.

[A14]
The image capture device assembly according to any one of [A01] to [A13], wherein the light source emits infrared light.

[A15]
The image capture device assembly according to any one of [A01] to [A14], wherein
the light source includes a semiconductor light emitting device.

[B01] <<Image Capture Device Assembly: Second Aspect>>
An image capture device assembly including:
a light source that emits a polarized reference light pattern;
an image capture device; and
a control device that controls the light source and the image capture device,
wherein the image capture device includes a first polarizer having a polarization axis in a direction parallel to a polarization direction of the reference light pattern, and a second polarizer having a polarization axis in a direction perpendicular to the polarization direction of the reference light pattern, the image capture device outputs a first image signal obtained on a basis of polarized light passed through the first polarizer to the control device, and outputs a second image signal obtained on a basis of polarized light passed through the second polarizer to the control device, and the control device generates a reference light pattern image signal from a difference between the first image signal and the second image signal.

[B02]

The image capture device assembly according to [B01], wherein the control device includes a frame memory, and any one of the first image signal and the second image signal is stored in the frame memory.

[B03]

The image capture device assembly according to [B01] or [B02], including one image capture device wherein the image capture device includes the first polarizer and the second polarizer.

[B04]

The image capture device assembly according to [B03], wherein the control device calculates a distance from the image capture device to the subject from the obtained reference light pattern image signal, on the basis of an active stereo method.

[B05]

The image capture device assembly according to [B01] or [B02], including two image capture devices wherein one of the image capture devices includes the first polarizer, and the other of the image capture device includes the second polarizer.

[B06]

The image capture device assembly according to [B05], wherein the control device calculates a distance from the image capture device to the subject from the obtained reference light pattern image signal, on the basis of an active stereo method.

[B07]

The image capture device assembly according to [B01] or [B02], including two image capture device wherein each of the image capture device includes the first polarizer and the second polarizer.

[B08]

The image capture device assembly according to [B07], wherein the control device calculates a distance from the image capture device to the subject from the obtained reference light pattern image signal, on the basis of a stereo method.

[B09]

The image capture device assembly according to any one of [B01] to [B08], wherein the light source emits infrared light.

[B10]

The image capture device assembly according to any one of [B01] to [B09], wherein the light source includes a semiconductor light emitting device.

[C01] <<Three-Dimensional Shape Measurement Device>>

A three-dimensional shape measurement device including the image capture device assembly according to any one of [A01] to [B10].

[C02]

The three-dimensional shape measurement device according to [C01], further including a computing unit, wherein the computing unit calculates a three-dimensional shape of a subject from a reference light pattern image signal.

[D01] <<Motion Detection Device>>

A motion detection device including the image capture device assembly according to any one of [A01] to [B10].

[D02]

The motion detection device according to [D01], further including a computing unit, wherein the computing unit calculates a three-dimensional shape of a subject from a reference light pattern signal, extracts a characteristic point of the subject from the calculated three-dimensional shape, calculates a position of the characteristic point of the subject, and detects a motion of the subject from change in the calculated position of the characteristic point.

[E01] <<Image Capture Method: First Aspect>>

An image capture method including:

irradiating a subject with a reference light pattern with high brightness and low brightness, respectively;

capturing an image of the reference light pattern and the subject in a high brightness irradiation state to obtain a first image signal, and capturing an image of at least the subject in a low brightness irradiation state to obtain a second image signal; and generating a reference light pattern image signal from a difference between the first image signal and the second image signal.

[E02] <<Image Capture Method: Second Aspect>>

An image capture method including:

irradiating a subject with a polarized reference light pattern;

obtaining a first image signal on the basis of polarized light which is polarized in a direction parallel to a polarization direction of the reference light pattern, and obtaining a second image signal on the basis of polarized light which is polarized in a direction perpendicular to the polarization direction of the reference light pattern or light that does not depend on the polarization direction; and generating a reference light pattern image signal from a difference between the first image signal and the second image signal.

[E03] <<Three-Dimensional Shape Measurement Method: First Aspect>>

A three-dimensional shape measurement method including:

irradiating a subject with a reference light pattern with high brightness and low brightness, respectively;

capturing an image of the reference light pattern and the subject in a high brightness irradiation state to obtain a first image signal, and capturing an image of at least the subject in a low brightness irradiation state to obtain a second image signal;

generating a reference light pattern image signal from a difference between the first image signal and the second image signal; and calculating a three-dimensional shape from the reference light pattern image signal.

[E04] <<Three-Dimensional Shape Measurement Method: Second Aspect>>

A three-dimensional shape measurement e method including:
- irradiating a subject with a polarized reference light pattern;
- obtaining a first image signal on the basis of polarized light which is polarized in a direction parallel to a polarization direction of the reference light pattern, and obtaining a second image signal on the basis of polarized light which is polarized in a direction perpendicular to the polarization direction of the reference light pattern or light that does not depend on the polarization direction;
- generating a reference light pattern image signal from a difference between the first image signal and the second image signal;
- calculating a three-dimensional shape from the reference light pattern image signal.

[E05] <<Motion Detection Method: First Aspect>>

A motion detection method including:
- irradiating a subject with a reference light pattern with high brightness and low brightness, respectively;
- sequentially capturing an image of the reference light pattern and the subject in a high brightness irradiation state to sequentially obtain a first image signal, and sequentially capturing an image of at least the subject in a low brightness irradiation state to sequentially obtain a second image signal;
- sequentially generating a reference light pattern image signal from a difference between the first image signal and the second image signal; and
- sequentially calculating a three-dimensional shape of the subject on the basis of the reference light pattern image signal, sequentially extracting a characteristic point of the subject from the calculated three-dimensional shape, sequentially calculating a position of the characteristic point of the subject, and detecting a motion of the subject from change in the position of the calculated characteristic point.

[E06] <<Motion Detection Method: Second Aspect>>

A motion detection method including:
- irradiating a subject with a polarized reference light pattern;
- sequentially obtaining a first image signal on the basis of polarized light which is polarized in a direction parallel to a polarization direction of the reference light pattern, and sequentially obtaining a second image signal on the basis of polarized light which is polarized in a direction perpendicular to the polarization direction of the reference light pattern or light that does not depend on the polarization direction;
- sequentially generating a reference light pattern image signal from a difference between the first image signal and the second image signal; and
- sequentially calculating a three-dimensional shape of the subject on the basis of the reference light pattern image signal, sequentially extracting a characteristic point of the subject from the calculated three-dimensional shape, sequentially calculating a position of the characteristic point of the subject, and detecting a motion of the subject from change in the position of the calculated characteristic point.

REFERENCE SIGNS LIST $100_1$, $100_2$, $200_1$, $200_2$, $200_3$ image capture device assembly
110, 210 light source
120, 120A, 120B, 220, 220A, 220B, 220C, 220D image capture device
130, 230 control device
131, 131A, 131B, 231A, 231B, 231 frame memory
140, 240 subject
221, 223 first polarizer
222, 224 second polarizer
11 camera main body
12 image processing unit
13 image storage unit
20 lens system
21 image capture lens
22 diaphragm
23 imaging lens
40 image capture element array
41 image capture element
51 first area
52 second area
60 silicon semiconductor substrate
61 photoelectric conversion element
63 color filter
64 on-chip lens
65 second flattening film
66 inorganic insulating ground layer
67 wire grid polarizer
67A wire grid polarizer for forming first area
67B wire grid polarizer for forming second area
68, 68A, 68B wire
69A light shielding layer
69B interconnect layer

The invention claimed is:

1. An image capture device assembly, comprising:
a light source configured to emit a reference light pattern to irradiate a subject with a first brightness;
an image capturing apparatus configured to:
  capture a first image and a second image of the reference light pattern and the subject in a first brightness irradiation state, wherein
    the image capturing apparatus comprises a first camera and a second camera,
    the first image is associated with the first camera and the second image is associated with the second camera,
    the reference light pattern with the first brightness irradiates the subject in the first brightness irradiation state, and
    a first image capture time associated with the capture of the first image and the second image is represented as T1;
  generate a first image signal associated with the captured first image and the captured second image;
  capture a third image and a fourth image of the subject in a second brightness irradiation state, wherein
    the third image is associated with the first camera and the fourth image is associated with the second camera,
    ambient light with a second brightness irradiates the subject in the second brightness irradiation state,
    the first brightness is higher than the second brightness, and
    a second image capture time associated with the capture of the second image is represented as T2;

generate a second image signal associated with the captured third image and the captured fourth image, wherein
one of the first image capture time T1 and the second image capture time T2 are variable based on a user instruction, or a ratio of T1/T2 is variable based on the user instruction,
the image capturing apparatus comprises a filter on an incident light side of the camera, and
a wavelength of light transmitted by the filter is same as a wavelength of the reference light pattern; and
circuitry, coupled with a frame memory, configured to:
control operations of the light source and the image capturing apparatus;
generate a reference light pattern image signal from a difference between the first image signal and the second image signal; and
determine a first angle associated with the first camera and a second angle associated with the second camera, based on the generated reference light pattern image signal, wherein
the first angle corresponds to an angle between a straight line, that connects a portion of the subject with which the emitted reference light pattern collides and the first camera, and a base line,
the second angle corresponds to an angle between a straight line, that connects the portion of the subject with which the emitted reference light pattern collides and the second camera, and the base line, and
the base line is a straight line between the first camera and the second camera; and
determine a distance between the subject and the image capturing apparatus based on the determined first angle and the determined second angle.

2. The image capture device assembly according to claim 1, wherein
at least one of the first image signal or the second image signal is stored in the frame memory.

3. The image capture device assembly according to claim 1, wherein T1>T2.

4. The image capture device assembly according to claim 1, wherein
an image capture frame of at least one of the first image or the second image is divided into a plurality of periods,
a first period of the plurality of periods is set to be in the second brightness irradiation state, and
a set of periods different from the first period are set to be in the first brightness irradiation state.

5. The image capture device assembly according to claim 4, wherein an image capture frame rate is 30 frames per second.

6. The image capture device assembly according to claim 1, wherein
a first image capture period at which the first image and the second image of the reference light pattern and the subject is captured in the first brightness irradiation state and a second image capture period at which the third image and the fourth image of the subject is captured in the second brightness irradiation state are repeated, and
the first image capture period is longer than the second image capture period.

7. The image capture device assembly according to claim 1, wherein
the image capturing apparatus further includes a plurality of image capture elements which are arranged in a first direction and a second direction in a two-dimensional matrix form;
the image capturing apparatus further includes a rolling shutter mechanism; and
the circuitry is further configured to control the operations of the light source and the image capturing apparatus so that:
the plurality of image capture elements is configured to capture the first image and the second image of the reference light pattern and the subject in the first brightness irradiation state and output the first image signal to the circuitry, and
the plurality of image capture elements captures the third image and the fourth image of the subject in the second brightness irradiation state and outputs the second image signal to the circuitry.

8. The image capture device assembly according to claim 1, wherein the light source is in an operation state in the high brightness irradiation state, and the light source is in a non-operation state in the low brightness irradiation state.

9. The image capture device assembly according to claim 1, wherein the first image, the second image, the third image, and the fourth image are stereo images.

10. A three-dimensional shape measurement device, comprising
an image capture device assembly that includes:
a light source configured to emit a reference light pattern to irradiate a subject with a first brightness;
an image capturing apparatus configured to:
capture a first image and a second image of the reference light pattern and the subject in a first brightness irradiation state, wherein
the image capturing apparatus comprises a first camera and a second camera,
the first image is associated with the first camera and the second image is associated with the second camera,
the reference light pattern with the first brightness irradiates the subject in the first brightness irradiation state, and
a first image capture time associated with the capture of the first image and the second image is represented as T1;
generate a first image signal associated with the captured first image and the captured second image;
capture a third image and a fourth image of the subject in a second brightness irradiation state, wherein
the third image is associated with the first camera and the fourth image is associated with the second camera,
ambient light with a second brightness irradiates the subject in the second brightness irradiation state,
the first brightness is higher than the second brightness, and
a second image capture time associated with the capture of the second image is represented as T2;

generate a second image signal associated with the captured third image and the captured fourth image, wherein
one of the first image capture time T1 and the second image capture time T2 are variable based on a user instruction, or a ratio of T1/T2 is variable based on the user instruction,
the image capturing apparatus comprises a filter on an incident light side of the camera, and
a wavelength of light transmitted by the filter is same as a wavelength of the reference light pattern; and
circuitry, coupled with a frame memory, configured to:
control operations of the light source and the image capturing apparatus;
generate a reference light pattern image signal from a difference between the first image signal and the second image signal; and
determine a first angle associated with the first camera and a second angle associated with the second camera, based on the generated reference light pattern image signal, wherein
the first angle corresponds to an angle between a straight line, that connects a portion of the subject with which the emitted reference light pattern collides and the first camera, and a base line,
the second angle corresponds to an angle between a straight line, that connects the portion of the subject with which the emitted reference light pattern collides and the second camera, and the base line, and
the base line is a straight line between the first camera and the second camera; and
determine a distance between the subject and the image capturing apparatus based on the determined first angle and the determined second angle.

11. The three-dimensional shape measurement device according to claim 10, further comprising a computing unit, wherein the computing unit is configured to calculate a three-dimensional shape of the subject from the generated reference light pattern image signal.

12. A motion detection device, comprising
an image capture device assembly that includes:
a light source configured to emit a reference light pattern to irradiate a subject with a first brightness;
an image capturing apparatus configured to:
capture a first image and a second image of the reference light pattern and the subject in a first brightness irradiation state, wherein
the image capturing apparatus comprises a first camera and a second camera,
the first image is associated with the first camera and the second image is associated with the second camera,
the reference light pattern with the first brightness irradiates the subject in the first brightness irradiation state, and
a first image capture time associated with the capture of the first image and the second image is represented as T1;
generate a first image signal associated with the captured first image and the captured second image;
capture a third image and a fourth image of the subject in a second brightness irradiation state, wherein
the third image is associated with the first camera and the fourth image is associated with the second camera,
ambient light with a second brightness irradiates the subject in the second brightness irradiation state,
the first brightness is higher than the second brightness, and
a second image capture time associated with the capture of the second image is represented as T2;
generate a second image signal associated with the captured third image and the captured fourth image, wherein
one of the first image capture time T1 and the second image capture time T2 are variable based on a user instruction, or a ratio of T1/T2 is variable based on the user instruction,
the image capturing apparatus comprises a filter on an incident light side of the camera, and
a wavelength of light transmitted by the filter is same as a wavelength of the reference light pattern; and
circuitry, coupled with a frame memory, configured to:
control operations of the light source and the image capturing apparatus;
generate a reference light pattern image signal from a difference between the first image signal and the second image signal; and
determine a first angle associated with the first camera and a second angle associated with the second camera, based on the generated reference light pattern image signal, wherein
the first angle corresponds to an angle between a straight line, that connects a portion of the subject with which the emitted reference light pattern collides and the first camera, and a base line,
the second angle corresponds to an angle between a straight line, that connects the portion of the subject with which the emitted reference light pattern collides and the second camera, and the base line, and
the base line is a straight line between the first camera and the second camera; and
determine a distance between the subject and the image capturing apparatus based on the determined first angle and the determined second angle.

13. The motion detection device according to claim 12, further comprising a computing unit, wherein the computing unit is configured to:
calculate a three-dimensional shape of the subject from the generated reference light pattern signal;
extract a characteristic point of the subject based on the calculated three-dimensional shape;
calculate a position of the characteristic point of the subject; and
detect a motion of the subject based on change in the calculated position of the characteristic point.

* * * * *